United States Patent
Lee et al.

(10) Patent No.: US 9,253,679 B2
(45) Date of Patent: Feb. 2, 2016

(54) METHOD FOR LOGGING MEASUREMENT RESULT IN WIRELESS COMMUNICATION SYSTEM AND APPARATUS FOR THE SAME

(71) Applicant: LG Electronics Inc., Seoul (KR)

(72) Inventors: Kyung Jun Lee, Gyeonggi-do (KR); Sung Duck Chun, Gyeonggi-do (KR); Sung Jun Park, Gyeonggi-do (KR); Jae Wook Lee, Gyeonggi-do (KR); Sung Hoon Jung, Gyeonggi-do (KR); Young Dae Lee, Gyeonggi-do (KR); Seung June Yi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 14 days.

(21) Appl. No.: 14/346,000

(22) PCT Filed: Oct. 10, 2012

(86) PCT No.: PCT/KR2012/008182
§ 371 (c)(1),
(2) Date: Mar. 20, 2014

(87) PCT Pub. No.: WO2013/055084
PCT Pub. Date: Apr. 18, 2013

(65) Prior Publication Data
US 2015/0044972 A1    Feb. 12, 2015

Related U.S. Application Data

(60) Provisional application No. 61/546,030, filed on Oct. 11, 2011.

(51) Int. Cl.
*H04W 24/00* (2009.01)
*H04W 24/10* (2009.01)

(52) U.S. Cl.
CPC ....................... *H04W 24/10* (2013.01)

(58) Field of Classification Search
CPC ........................................... H04W 24/10
USPC ................................ 455/67.11, 411, 420, 561
See application file for complete search history.

(56) References Cited

U.S. PATENT DOCUMENTS

| 8,478,200 B2 * | 7/2013 | Kim et al. .................. 455/67.11 |
| 2010/0330921 A1 | 12/2010 | Kim et al. |
| 2011/0199923 A1 * | 8/2011 | Persson et al. ................. 370/252 |

OTHER PUBLICATIONS

LG Electronics, Inc., "Continuation of MDT at EPLMN," 3GPP TSG-RAN WG3 #70, R2-113900, Aug. 22-26, 2011.

(Continued)

*Primary Examiner* — Tuan H Nguyen
(74) *Attorney, Agent, or Firm* — Morgan, Lewis & Bockius LLP

(57) ABSTRACT

A method for logging measurement results in a wireless communication system is provided. The method includes: receiving a logged measurement configuration from a network, the logged measurement configuration comprising information for performing logged Minimization Driving Test (MDT); measuring at least one cell based on the logged measurement configuration; determining whether the measurement result has importance for logging; if a storage space for logging is enough for additionally logging, setting an importance tag of the measurement result to a predetermined value in accordance with the determination; and logging the measurement result and the importance tag in the storage space.

20 Claims, 24 Drawing Sheets

(56) References Cited

OTHER PUBLICATIONS

Puttonen et al., "Coverage Optimization for Minimization of Drive Tests in LTE with Extended RLF Reporting," Personal Indoor and Mobile Radio Communications (PIMRC), 2010 IEEE 21st International Symposium, Sep. 26-30, 2010.

International Search Report issued in corresponding International Patent Application No. PCT/KR2012/008182 dated Mar. 4, 2013.

* cited by examiner

METHOD FOR LOGGING MEASUREMENT RESULT IN WIRELESS COMMUNICATION SYSTEM AND APPARATUS FOR THE SAME

BACKGROUND OF THE INVENTION

1. Field of the Invention

The present invention relates to a wireless communication, more particularly, to a method for logging measurement results in a wireless communication and an apparatus supporting the same.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Minimization of driving tests (MDT) is a test performed by service providers for coverage optimization by using user equipment (UE) instead of using an automobile. Coverage varies depending on the location of a base station (BS), the arrangement of buildings nearby, and the usage environment of a user. Therefore, it is required for the service providers to periodically perform the driving test, and a lot of costs and resources are consumed. The MDT is used when a service provider measures coverage by using UE.

The service provider collects measurement results reported from a plurality of UEs to create a coverage map showing service availability and distribution of service quality in all areas of services. For example, if the service provider receives a report about the problem of coverage in a particular area from the UE, it may extend the coverage of cells in that area by increasing the transmission power of the base station which provides service to that area.

In the MDT method, the UE may log a plurality of measurement results and report the logged measurements to the network. The measurement and logging by the UE may be performed periodically or based on a specific event. Available storage space for the UE to log measurement results is limited. If the UE performs measurement and logging a plurality of times, there may be no storage space left for logging, and subsequently the UE may not performed further measurement/logging. Therefore, there is a need for discussion about the measurement result logging method to be performed by the UE, in relation to limited storage space for the UE's logging.

SUMMARY OF THE INVENTION

An object of the present invention is to provide a method for logging measurement results in a wireless communication system and an apparatus supporting the same.

In an aspect, a method for logging measurement results in a wireless communication system is provided. The method includes: receiving a logged measurement configuration from a network, the logged measurement configuration comprising information for performing logged Minimization Driving Test (MDT); measuring at least one cell based on the logged measurement configuration; determining whether the measurement result has importance for logging; if a storage space for logging is enough for additionally logging, setting an importance tag of the measurement result to a predetermined value in accordance with the determination; and logging the measurement result and the importance tag in the storage space.

If it is determined that the measurement result has the importance for logging, the importance tag set to '1' for indicating that the measurement result may have the importance for logging.

If it is determined that the measurement result does not the importance for logging, the importance tag set to '0' for indicating that the measurement result may not have the importance for logging.

If the measuring is triggered by a predetermined event, it may be determined that the measurement result has the importance for logging.

If the measurement result is measured on a low-interference resource, it may be determined that the measurement result has the importance for logging.

If the measurement result is affected by in-device transmission, it may be determined that the measurement result does not have the importance for logging.

If the storage space is not enough for additionally logging and it is determined that the measurement result does not have the importance for logging, the method may further include discarding the measurement result.

If the storage space is not enough for additionally logging and it is determined that the measurement result has the importance for logging, the method may further include: setting the importance tag of the measurement result to a value indicating that the measurement result has the importance for logging; if at least one logged measurement result not having the importance for logging is stored in the storage space, discarding one of the at least one logged measurement result not having the importance for logging; and logging the measurement result and the importance tag in the storage space.

If any logged measurement result not having the importance for logging is not stored in the stored space, the method may further include: discarding a firstly logged measurement result having the importance among at least one logged measurement result having the importance included in the storage space; and logging the measurement result and the importance tag in the storage space.

If any logged measurement result not having the importance for logging is not included in the storage space, the method may further include discarding the measurement result.

In another aspect, an apparatus operating in a wireless communication system is provided. The apparatus includes: a Radio Frequency (RF) unit transmits and receives radio signals; a memory for logging at least one measurement result; and a processor operably coupled to the RF unit. The processor is configured to: receive a logged measurement configuration from a network, the logged measurement configuration comprising information for performing logged Minimization Driving Test (MDT); measure at least one cell based on the logged measurement configuration; determine whether the measurement result has importance for logging; if the memory is enough for additionally logging, set an importance tag of the measurement result to a predetermined value in accordance with the determination; and log the measurement result and the importance tag in the memory.

UE logs a measurement result with an importance tag, depending on the importance of the measurement result. If there is not enough storage space for logging, the UE compares the importance of a new measurement result with the importance of existing logged measurement results, and determine whether to log the new measurement result based on importance. The UE may preferentially log a measurement result of importance and report it to the network. By this, the UE may prevent the problem that the network does not get enough measurement results by stopping logging in the case of lack of storage space.

The UE may determine whether a measurement result is of importance or not and/or the level of importance of the measurement result, and log an importance tag as well, based on whether a specific condition is satisfied or not. Therefore, the network may preferentially obtain a measurement result satisfying the above condition, and based upon this, the performance of the network may be improved.

DESCRIPTION OF EXEMPLARY EMBODIMENTS

Figure 1:
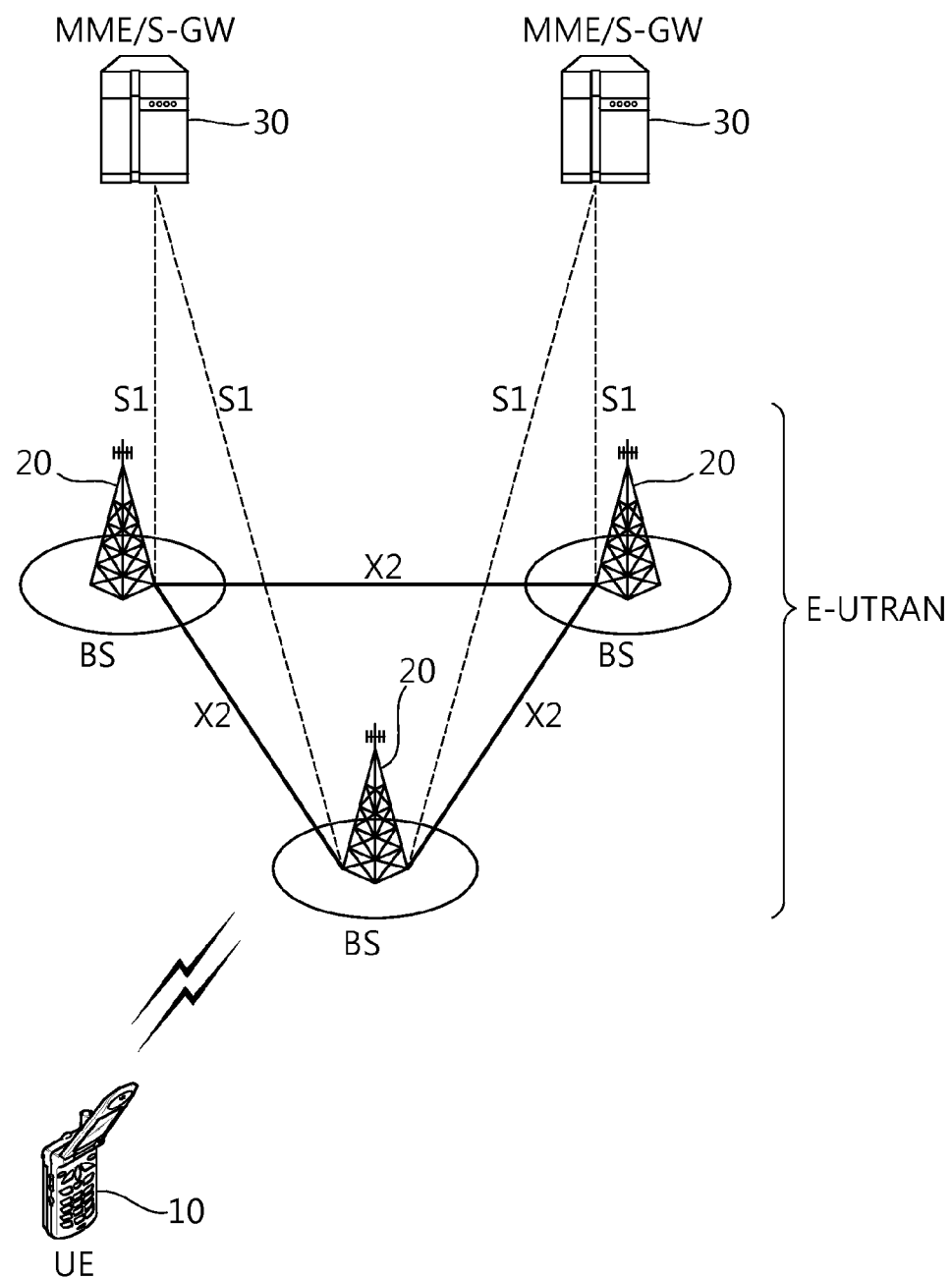
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless apparatus, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
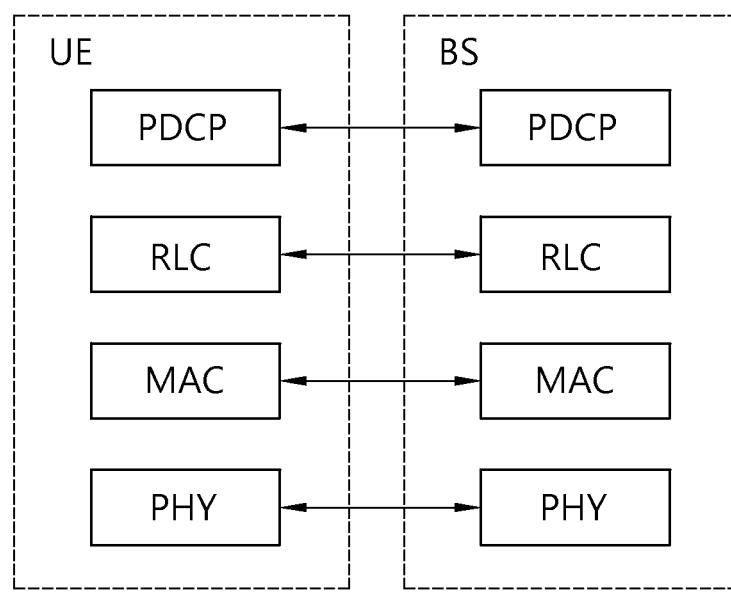
FIG. 2 is a diagram illustrating a radio protocol architecture for a user plane.
Figure 3:
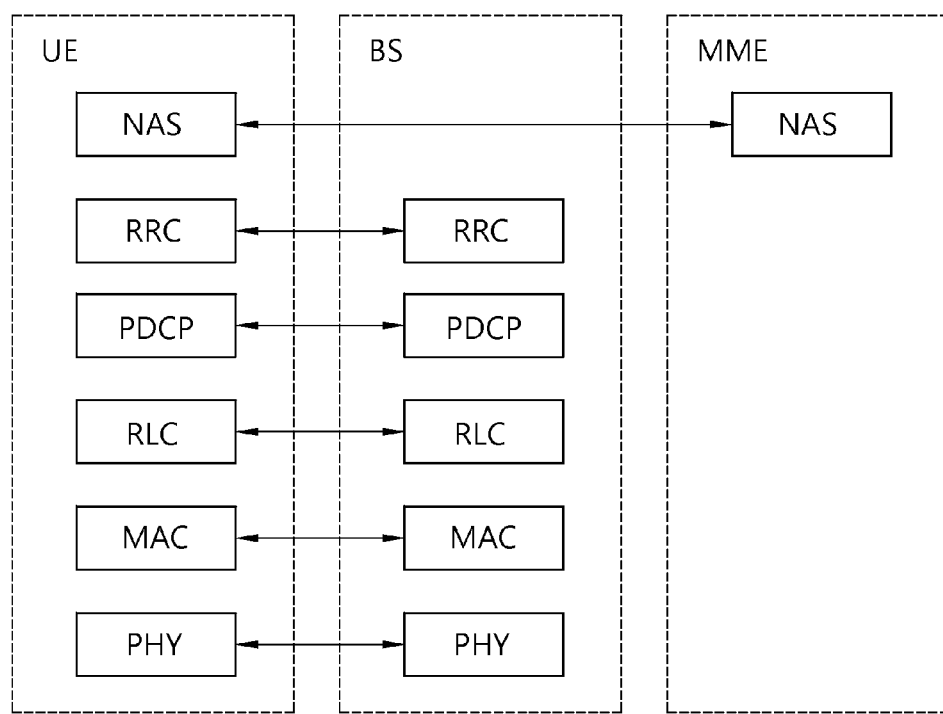
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-September) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
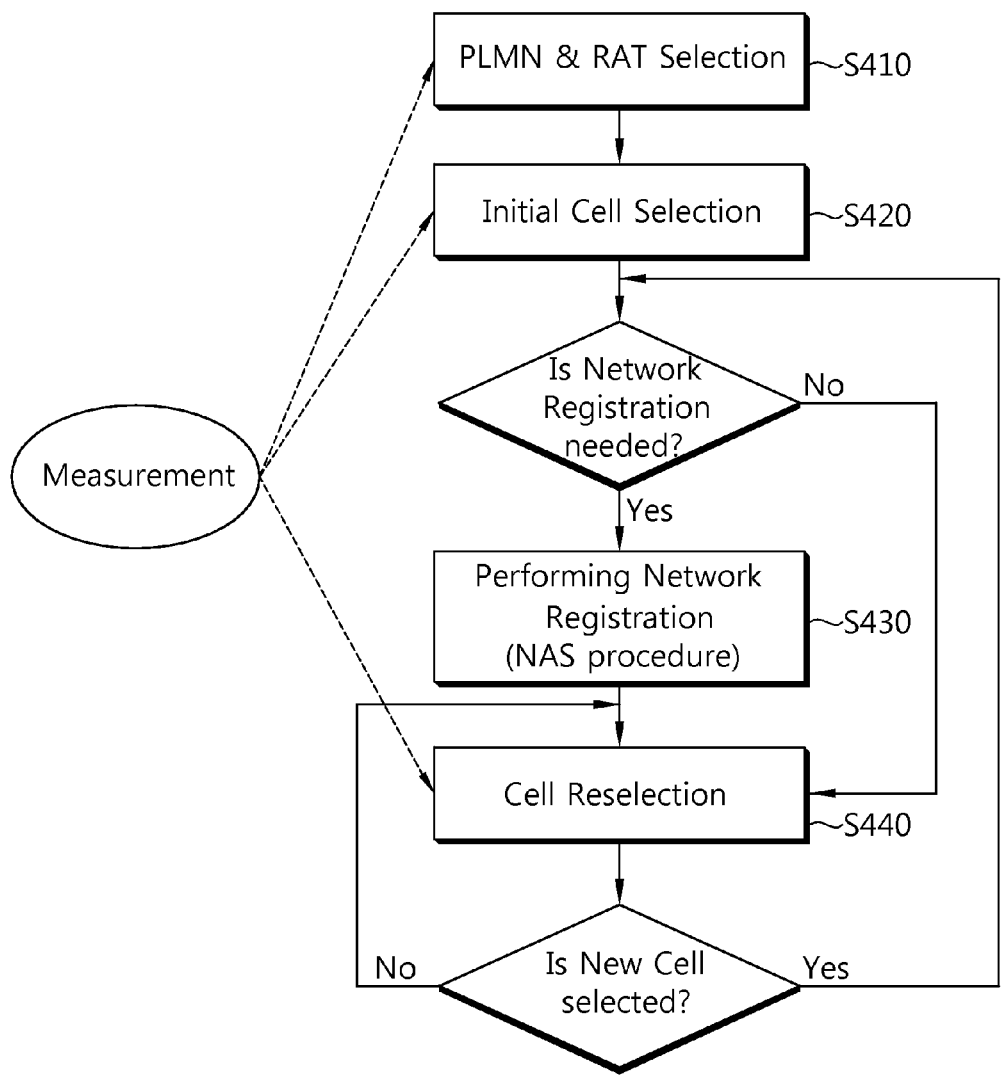
FIG. 4 is a flow chart illustrating an operation of a UE in an RRC idle state.

FIG. 4 is a flow chart illustrating an operation of a UE in an RRC idle state. Specifically, FIG. 4 shows a procedure in which a UE is registered to a network through a cell selection process when power of the UE is turned on, and a cell re-selection is performed when necessary.

Referring to FIG. 4, the UE selects a radio access technology (RAT) for communicating with a PLMN (public land mobile network) as a network the UE wants to receive a service therefrom (S410). Information regarding the PLUM and RAT may be selected by a user of the UE, or that stored in a USIM (universal subscriber identity module) may be used.

The UE selects a cell having the greatest value among cells in which signal strength or quality thereof is greater than a particular value (S420). This is performed by a UE as power thereof is turned on, which may be called an initial cell selection. The cell selection procedure will be described later. After the cell selection, the UE receives system information periodically transmitted by a BS. The particular value refers to a value defined in the system in order to guarantee quality of a physical signal in data transmission and reception. Thus, it may vary according to an applied RAT.

When a network registration is required, the UE performs a network registration procedure (S430). In order to receive a service (e.g., paging) from the network, the UE registers its information (e.g., an IMSI). The UE is not registered to a network whenever a cell is selected, and registered to a network when information (e.g., tracking area identity (TAI) of a network received from the system information and information of a network the UE knows are different.

The UE performs cell re-selection based on a service environment provided in a cell, a terminal environment, or the like (S440). When signal strength or quality value measured from a BS serving the UE is lower than a value measured from a BS of an adjacent cell, the UE selects one of cells providing better signal characteristics than that of the cell of the BS the UE has accessed. This process is called a cell re-selection, discriminated from initial cell selection performed twice. Here, in order to prevent a cell is frequently re-selected according to a change in signal characteristics, a temporal constraint is provided. The cell re-selection procedure will be described later.

Figure 5:
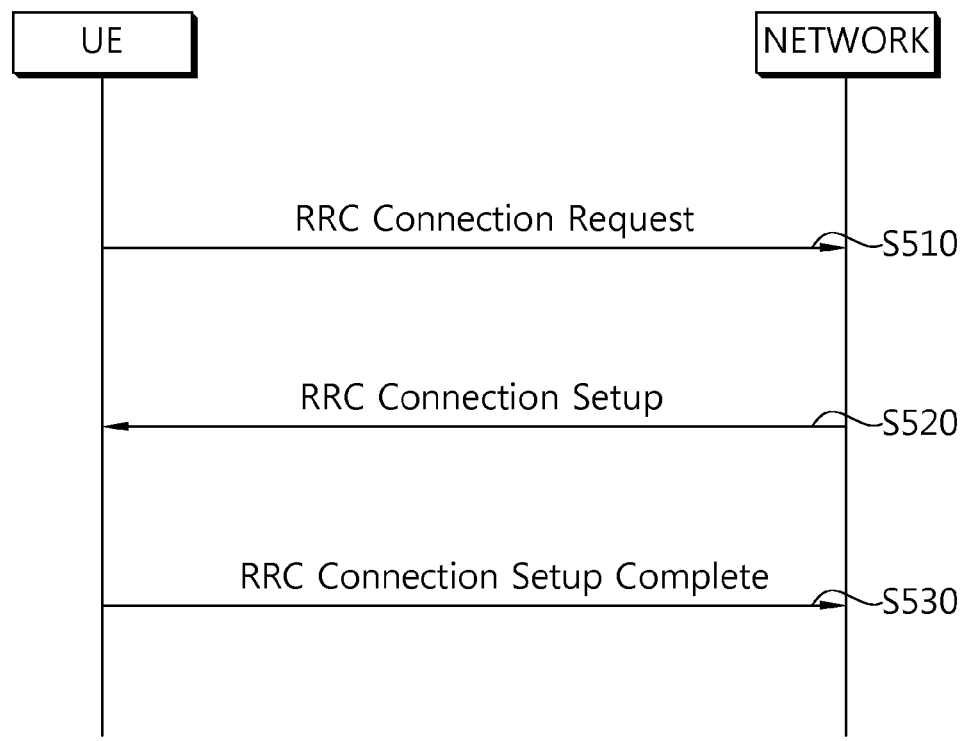
FIG. 5 is a flowchart showing an RRC connection establishment procedure.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

Figure 6:
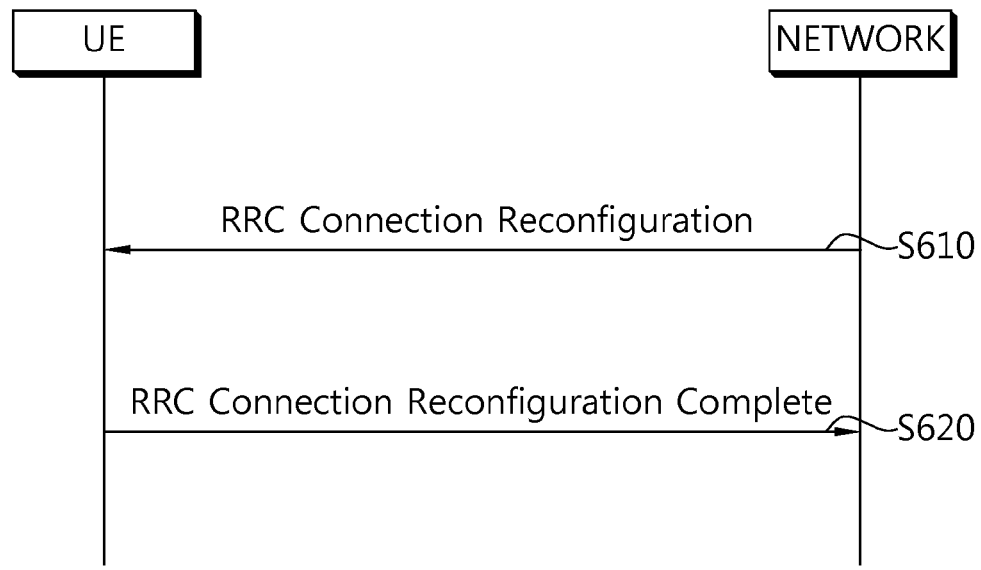
FIG. 6 is a flowchart showing an RRC connection reconfiguration procedure.

FIG. 6 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-March) "User Equipment (UE) procedures in idle mode (Release 8)", a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$R_s = Q_{meas,s} + Q_{hyst},$$

$$R_n = Q_{meas,n} - Q_{offset} \quad \text{[Math FIG. 1]}$$

Herein, Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qoffset=Qoffsets,n. Otherwise, Qoffset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

A Radio Link Monitoring (RLM) will be described.

The UE shall monitor the downlink link quality based on the cell-specific reference signal in order to detect the downlink radio link quality of the PCell. The UE shall estimate the downlink radio link quality and compare it to the thresholds Qout and Qin for the purpose of monitoring downlink radio link quality of the PCell. The threshold Qout is defined as the level at which the downlink radio link cannot be reliably received and shall correspond to 10% block error rate of a hypothetical PDCCH transmission taking into account the PCFICH errors. The threshold Qin is defined as the level at which the downlink radio link quality can be significantly more reliably received than at Qout and shall correspond to 2% block error rate of a hypothetical PDCCH transmission taking into account the PCFICH errors.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

In the specification of 3GPP LTE, normal communication cannot be performed in the following conditions.

When a UE determines that there is a serious problem with a downlink communication link quality based on radio quality measurement result of a physical layer of the UE.

When it is determined that there is a problem with an uplink transmission as a random access procedure fails continuously in a MAC sub-layer.

When it is determined that there is a problem with an uplink transmission as an uplink data transmission continuously fails in an RLC sublayer.

When it is determined that handover has failed.

When a message received by the UE does not pass integrity check.

Hereinafter, an RRC connection re-establishment procedure will be described in detail.

Figure 7:
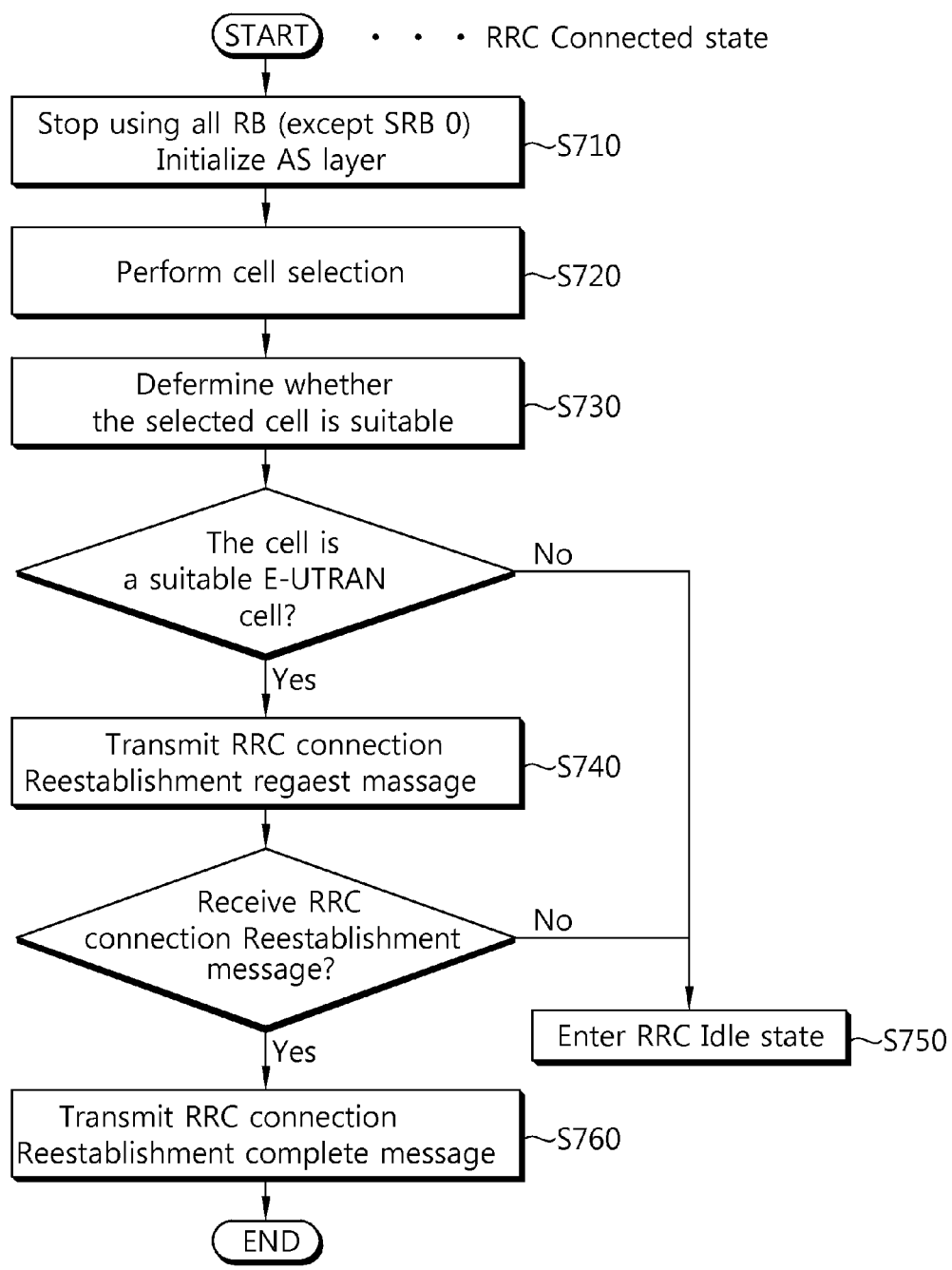
FIG. 7 is a flow chart illustrating an RRC connection re-establishment procedure.

FIG. 7 is a flow chart illustrating an RRC connection re-establishment procedure.

Referring to FIG. 7, a UE stops using of all the set radio bearers excluding SRB0 (Signaling Radio Bearer #0), and initializes various sub-layers of an Access Stratum (AS) (S710). Also, the UE sets each sub-layer and physical layer as a default configuration. During this process, the UE is maintained in an RRC connected state.

The UE performs a cell selection procedure to perform an RRC connection re-establishment procedure (S720). Although the UE is maintained in the RRC connected state, the cell selection procedure included in the RRC connection re-establishment procedure may be performed in the same manner as the cell selection procedure performed by the UE in an RRC idle state.

After performing the cell selection procedure, the UE checks system information of a corresponding cell to determine whether or not the corresponding cell is an appropriate cell (S730). When the selected cell is determined to be an appropriate E-UTRAN cell, the UE transmits an RRC connection reestablishment request message to the corresponding cell (S740).

Meanwhile, when it is determined that the cell selected through the cell selection procedure to perform an RRC connection re-establishment procedure is a cell that uses a different RAT other than the E-UTRAN, the RRC connection re-establishment procedure is stopped and the UE enters an RRC idle state (S750).

The UE may be implemented to finish checking appropriateness of a cell within a limited time through the cell selection procedure and reception of system information of a selected cell. To this end, the UE may drive a timer when an RRC connection re-establishment procedure starts. The timer may be stopped when the UE determines that an appropriate cell has been selected. When the timer expires, the UE may determine that the RRC connection reestablishment procedure has failed and enters an RRC idle state. The timer will be referred to as a radio link failure timer hereinafter. In the LTE specification TS 36.331, a timer named T311 may be utilized as a radio link failure timer. The UE may obtain a set value of the timer from system information of a serving cell.

When the cell receives an RRC connection re-establishment request message from the UE and accepts the request, the cell transmits an RRC connection reestablishment message to the UE.

The UE, which received the RRC connection reestablishment message from the cell, reconfigures a PDCP sublayer and an RLC sublayer with respect to an SRB 1. Also, the UE re-calculates various key values in relation to security setting, and re-configures a PDCP sublayer responsible for security with newly calculated security key values. Through this, the SRB1 between the UE and the CELL is open, and an RRC control message may be exchanged. The UE completes resuming of the SRB1, and transmits an RRC connection reestablishment complete message indicating that the RRC connection reestablishment procedure was completed to the cell (S760).

Meanwhile, upon receiving the RRC connection reestablishment request message, if the cell does not accept the request, the cell transmits an RRC connection reestablishment reject message to the UE.

When the RRC connection reestablishment procedure is successfully performed, the cell and the terminal performs an RRC connection reestablishment procedure. Through this, the UE may recover the state before the RRC connection reestablishment procedure was performed and continuity of a service is guaranteed to its maximum level.

The following description is related to a Radio Link Failure (RLF) report.

In order to support mobility robustness optimization (MRO) of a network, when a radio link failure or a handover failure occurs, the UE reports such a failure event to the network.

UE may provide the RLF report to the eNB after successful RRC connection reestablishment. The radio measurements contained in the RLF report may be used to identify coverage issues as the potential cause of the failure. This information may be used to exclude those events from the MRO evaluation of intra-LTE mobility connection failures and redirect them as input to other algorithms.

In case the RRC connection reestablishment fails or the UE does not perform any RRC connection reestablishment, the UE may make the RLF report available to the eNB after reconnecting from idle mode. For this purpose, the UE stores the latest RLF or handover failure related information, and indicates RLF report availability at each subsequent LTE RRC connection (re)establishment and handover to an LTE cell until the RLF report is fetched by the network or for 48 hours after the RLF or handover failure is detected.

The UE keeps the information during state transitions and RAT changes, and indicates RLF report availability again after it returns to the LTE RAT.

Availability of the RLF report at the RRC connection setup procedure is the indication that the UE suffered from a connection failure and that the RLF report from this failure was not yet delivered to the network. The RLF report from the UE includes the following information:

The E-CGI of the last cell that served the UE (in case of RLF) or the target of the handover (in case of handover failure). If the E-CGI is not known, the PCI and frequency information are used instead.

E-CGI of the cell that the reestablishment attempt was made at.

E-CGI of the cell that served the UE at the last handover initialization, i.e. when message 7 (RRC connection reconfiguration) was received by the UE.

Time elapsed since the last handover initialization until connection failure.

An indication whether the connection failure was due to RLF or handover failure.

The radio measurements.

Location of failure.

The eNB receiving the RLF report from the UE may forward the report to the eNB that served the UE before the reported connection failure.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 8:
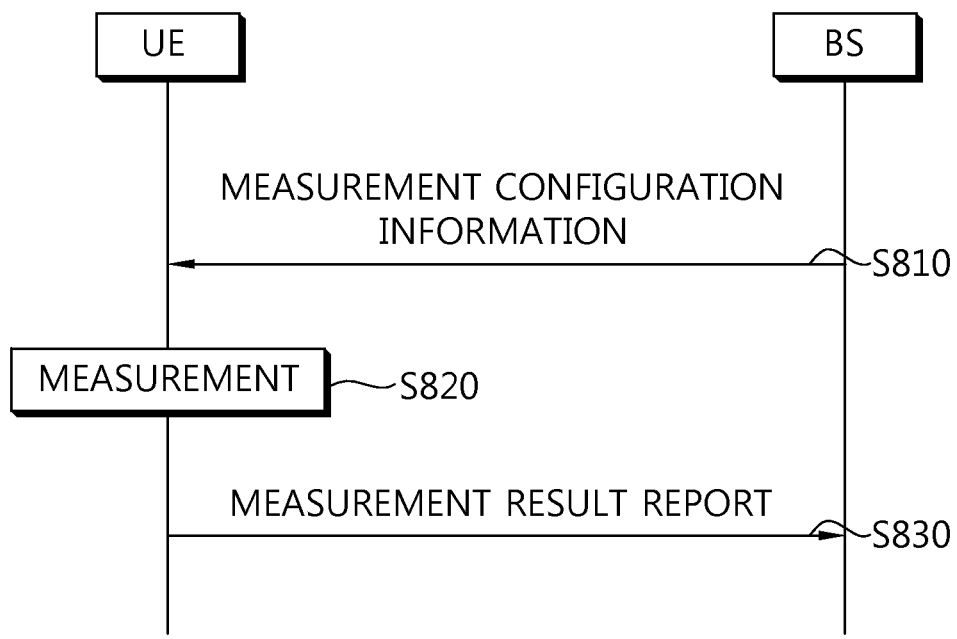
FIG. 8 is a flowchart showing a conventional method of performing measurement.

FIG. 8 is a flowchart showing a conventional method of performing measurement.

A UE receives measurement configuration information from a BS (step S810). A message including the measurement configuration information is referred to as a measurement configuration message. The UE performs measurement based on the measurement configuration information (step S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting type. The reporting criterion may include information about events which trigger the reporting of the measurement results and periods when the reporting of the measurement results is periodically triggered. The reporting type is information regarding a type of a format of the measurement results.

(3) Measurement identity: By linking a measurement object with a reporting configuration, thereby it makes a UE determine that what measurement result is reported, when the measurement object is reported, and how format of the measurement result is reported. Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-March) "Evolved Universal Terrestrial Radio Access (E-UTRA) Radio Resource Control (RRC); Protocol specification (Release 8)".

TABLE 1

| Event | Reporting Condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 9:
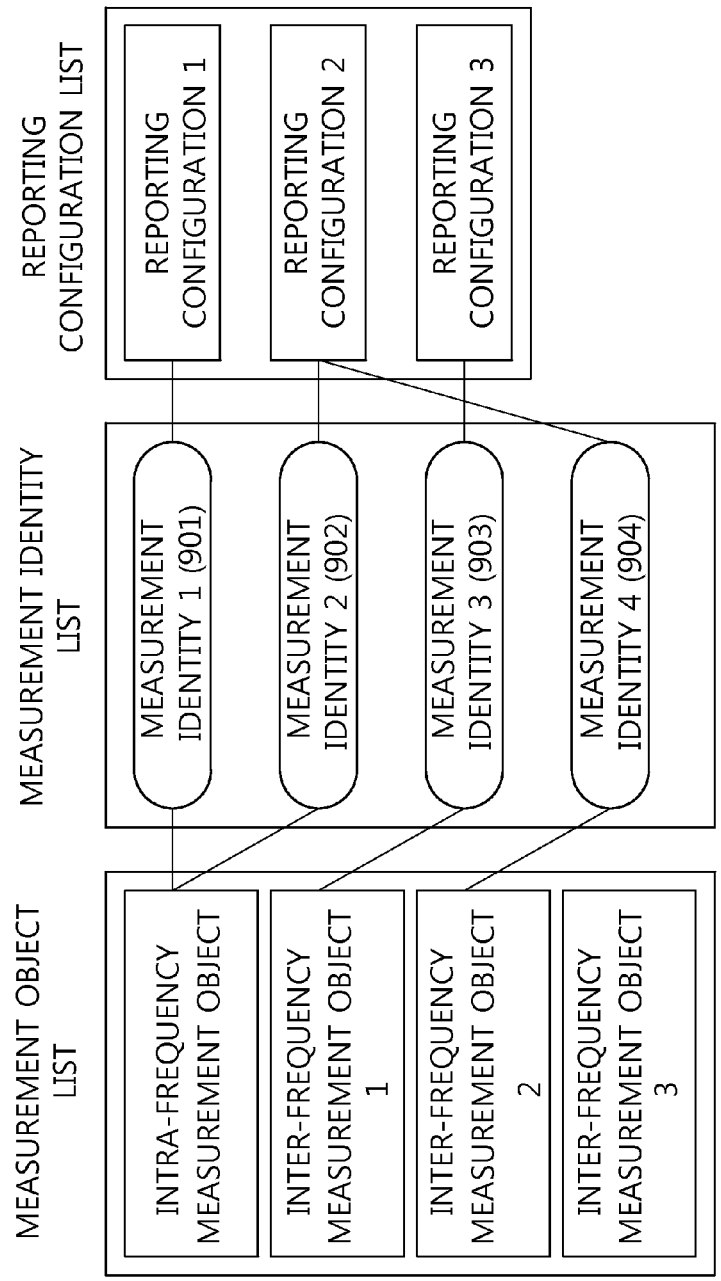
FIG. 9 shows an example of a measurement configuration assigned to a UE.

FIG. 9 shows an example of a measurement configuration assigned to a UE.

First, a measurement identity1 901 associates an intra-frequency measurement object with a reporting configuration 1. The UE performs intra-frequency measurement. The reporting configuration 1 is used to determine a reporting type and a criterion for reporting a measurement result.

A measurement identity2 902 is associated with the intra-frequency measurement object similarly to the measurement identifier) 901, and associates the intra-frequency measurement object with a reporting configuration 2. The UE performs intra-frequency measurement. The reporting configuration 2 is used to determine a reporting format and a criterion for reporting a measurement result.

By using the measurement identity) 901 and the measurement identity2 902, the UE transmits a measurement result even if the measurement result on the intra-frequency measurement object satisfies any one of the reporting configuration 1 and the reporting configuration 2.

A measurement identity3 903 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 904 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 10:
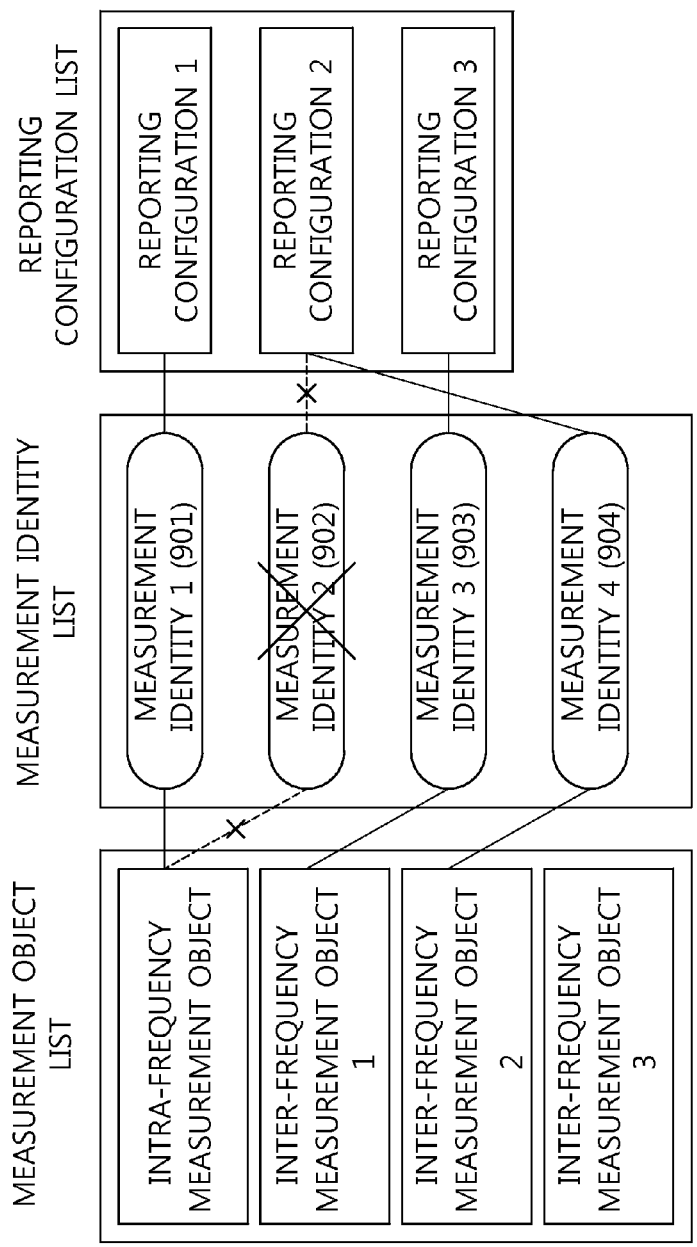
FIG. 10 shows an example of deleting a measurement identity.

FIG. 10 shows an example of deleting a measurement identity. When a measurement identity2 902 is deleted, measurement on a measurement object associated with the measurement identity2 902 is suspended, and a measurement report is not transmitted. A reporting configuration or a measurement object associated with the deleted measurement identity may not be modified.

Figure 11:
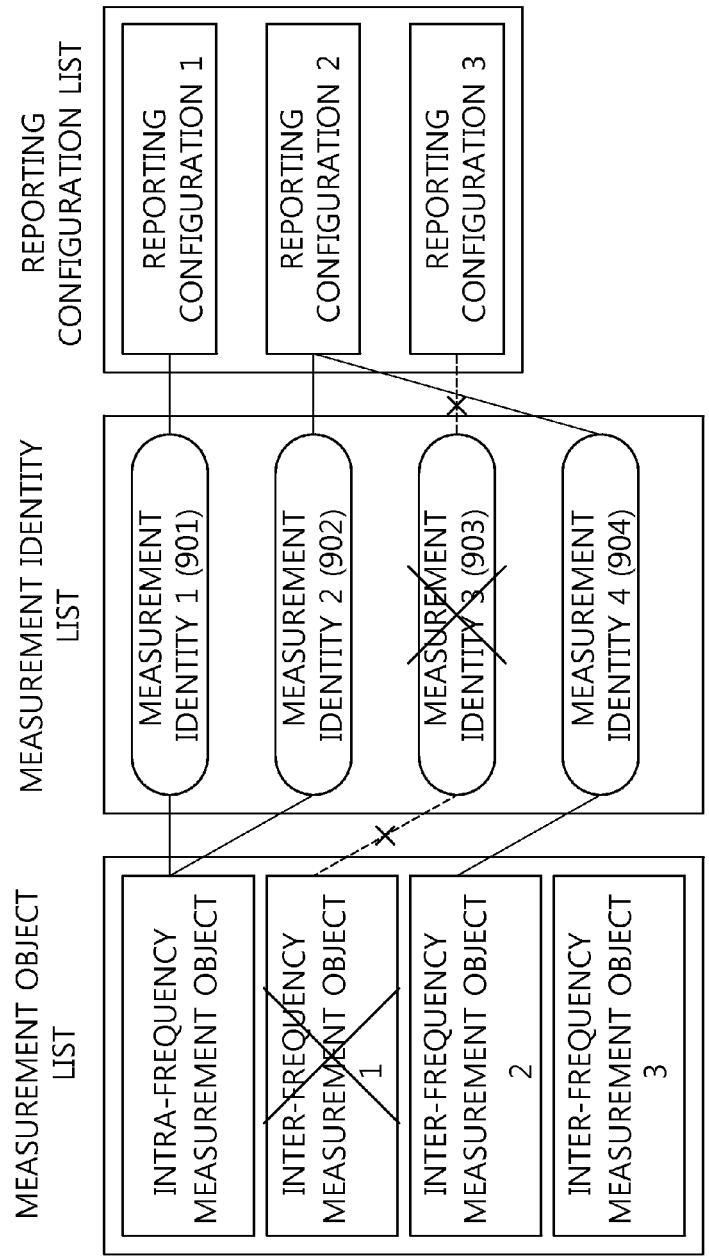
FIG. 11 shows an example of deleting a measurement object.

FIG. 11 shows an example of deleting a measurement object. When an inter-frequency measurement object 1 is deleted, a UE also deletes an associated measurement identifier3 903. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

The following description is about an accessibility measurement.

There are many aspects regarding measuring the non-availability of a connection for a UE. It deals with both coverage of common channels and connection procedures. To inform the non-availability of a connection to network and thus to help parameter optimization in order to increase the availability of a connection, UE performs accessibility measurements when connection establishment fails. For the accessibility measurements, UE performs logging of the followings:

Time stamp is included, which is derived by using a relative timer counting the time between failure and reporting. The storing time for accessibility measurements should be 48 hours.

Reporting the Number of Random access preambles transmitted shall be supported.

The indication whether maximum power level was reached should be included.

The indication whether contention was detected during the random access procedures for connection establishment.

The following description is about an H(e)NB.

In addition to a mobile network vendor, a mobile communication service can be provided via an eNB of an individual user or a specific vendor or a group owner. Such an eNB is called a home node B (HNB) or a home eNB (HeNB). Hereinafter, both the HNB and HeNB are collectively referred to as the HeNB. The HeNB is basically used to provide specialized services only to members of a closed subscriber group (CSG). However, according to operation mode setting of the HeNB, the services may also be provided to other users in addition to the users of the CSG.

Figure 12:
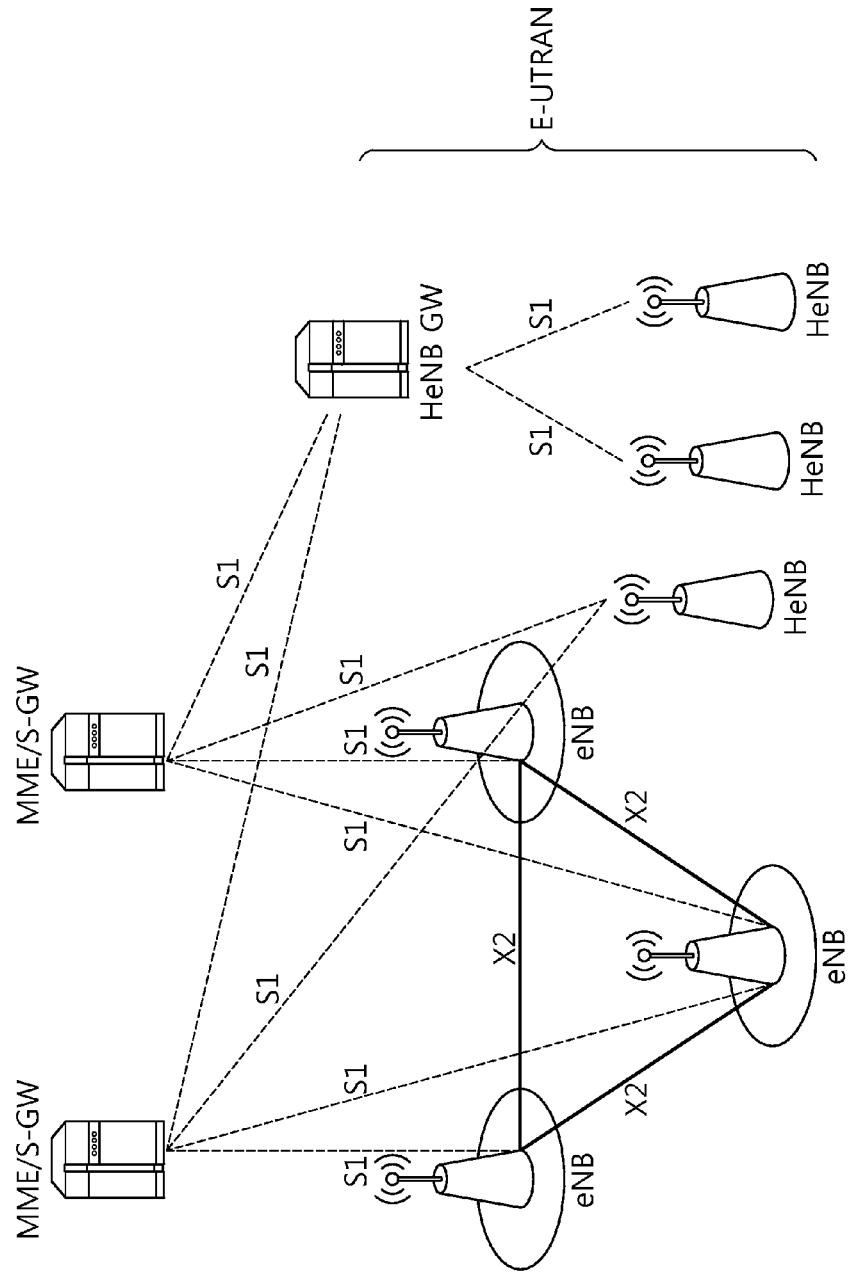
FIG. 12 shows an example of a wireless communication system for operating a HeNB.

FIG. 12 shows an example of a wireless communication system for operating a HeNB.

Referring to FIG. 12, a home eNB gateway (HeNB GW) can be operated to provide a service to the HeNB as described above. HeNBs are connected to an EPC directly or via the HeNB GW. An MME regards the HeNB GW as a typical eNB. Further, the HeNB regards the HeNB GW as the MME. Therefore, the HeNB and the HeNB GW are connected by means of an S1 interface, and also the HeNB GW and the EPC are connected by means of the S1 interface. Furthermore, even in a case where the HeNB and the EPC are directly connected, they are connected by means of the S1 interface. A function of the HeNB is almost similar to a function of the typical eNB.

In general, the HeNB has radio transmission output power lower than that of an eNB owned by a mobile network vendor.

Therefore, in general, the coverage provided by the HeNB is smaller than the coverage provided by the eNB. Due to such characteristics, a cell provided by the HeNB is often classified as a femto cell in contrast to a macro cell provided by the eNB from the perspective of the coverage. Meanwhile, from the perspective of provided services, when the HeNB provides the services only to the CSG group, a cell provided by this HeNB is referred to as a CSG cell.

Each CSG has its own identity which is called a CSG identity (CSG ID). The UE may have a list of CSGs to which the UE belongs as a member thereof, and this CSG list may be referred as a CSG white list. The CSG white list may change by a request of the UE or by a command of the network. In general, one HeNB can support one CSG.

The HeNB delivers the CSG ID of the CSG supported by the HNB itself by using system information, so as to allow access of only a member UE of the corresponding CSG. When the CSG cell is found, the UE may read the CSG ID included in the system information to determine which CSG is supported by the CSG cell. The UE that has read the CSG ID regards the corresponding cell as an accessible cell only if the UE itself is a member of the corresponding CSG cell.

It is not always required for the HeNB to allow access of the CSG UE. Based on the configuration setting of the HeNB, access of a non-CSG member UE may also be allowed. According to the configuration setting of the HeNB, access is allowed for a different UE. Herein, the configuration setting denotes setting of an operation mode of the HeNB. The operation mode of the HeNB is classified into three modes described below, depending on a type of UE for which a service is provided.

1) Closed access mode: A mode in which services are provided to particular CSG members only. The HeNB provides a CSG cell.

2) Open access mode: A mode in which services are provided without any restriction of particular CSG members, similarly to the typical eNB. The HeNB provides a typical cell instead of a CSG cell.

3) Hybrid access mode: A mode in which CSG services are provided to particular CSG members and also services are provided to non-CSG members, similarly to a typical cell. It is recognized as a CSG cell for the CSG member UE, and recognized as a typical cell for the non-CSG member UE. This cell is called a hybrid cell.

The HeNB notifies to the UE whether a cell serviced by the HeNB is a CSG cell or a typical cell, and thus allows the UE to know whether the UE can access to the cell. When operating in the closed access mode, the HeNB broadcasts that the cell serviced by the HeNB is the CSG cell by using system information. When operating in the open access mode, the HeNB broadcasts that the cell serviced by the HeNB is not the CSG cell by using the system information. In this manner, the HeNB inserts a CSG indicator into the system information, wherein the CSG indicator indicates whether the cell being serviced by the HeNB is the CSG cell or not. For example, the CSG cell broadcasts the CSG indicator by setting it to 'TRUE'. If the cell being serviced is not the CSG cell, a method of setting the CSG indicator to 'FALSE' or omitting transmission of the CSG indicator may be used. Since the UE has to distinguish the CSG cell provided by the eNB from the typical cell, the typical eNB may also transmit the CSG indicator so as to allow the UE to know that the cell type provided by the eNB is the typical cell. The typical eNB may allow the UE to know that the cell type provided by the eNB is the typical cell by not transmitting the CSG indicator. The CSG-related parameters transmitted by the corresponding cell for each cell type are represented in Table 2. Subsequently, a type of UE for which access is accepted is represented in Table 3.

TABLE 2

|  | CSG Cell | Typical Cell |
|---|---|---|
| CSG Indicator | 'CSG Cell' is indicated | 'Non-CSG cell' is indicated, or not transmitted |
| CSG ID | Supported CSG ID is transmitted | Not transmitted |

TABLE 3

|  | CSG Cell | Typical Cell |
|---|---|---|
| UE not supporting CSG | Access denied | Access accepted |
| Non-CSG member UE | Access denied | Access accepted |
| CSG member UE | Access accepted | Access accepted |

From UE perspective, the list of CSGs to which the UE is considered CSG member should be managed. The list of CSGs is referred to as CSG white-list for the UE. Operator should also manage CSG subscription data of its subscribers.

The CSG subscription data of UEs are stored in Home Subscriber Server (HSS). The CSG subscription data is transferred to MME when UE registers with network. For a UE, the CSG subscription data is stored in Universal Subscriber Identity Module (USIM) of the UE.

Figure 13:
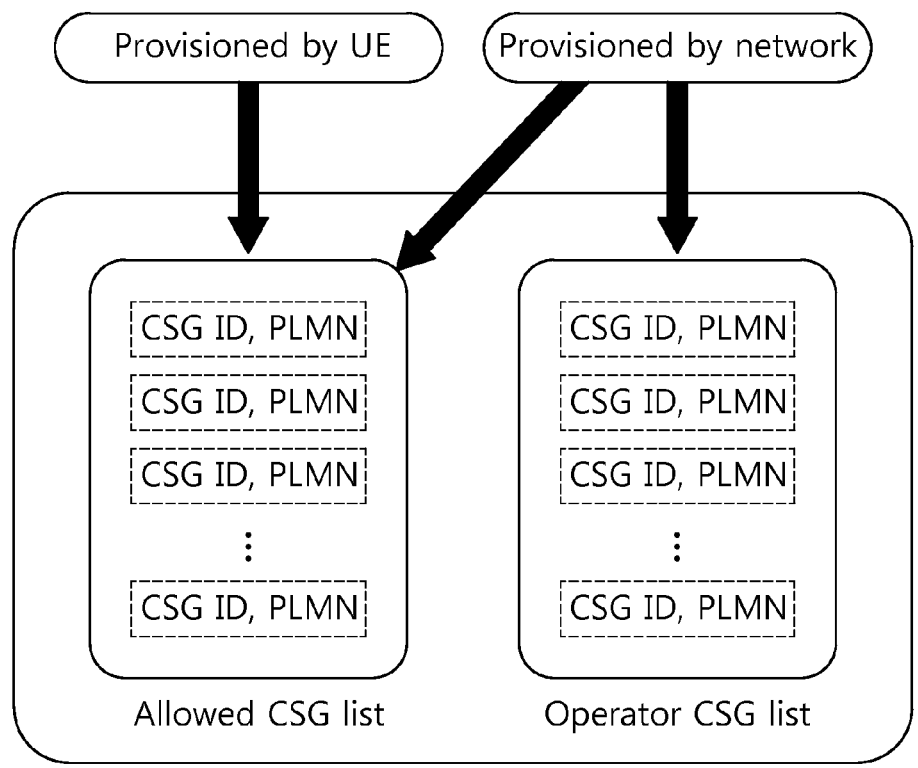
FIG. 13 illustrates an example of CSG white-list structure.

FIG. 13 illustrates an example of CSG white-list structure.

As shown in FIG. 13, CSG white-list consists of 'Allowed CSG list' and 'Operator CSG list'. The Allowed CSG list can be provisioned by both UE and network, while the Operator CSG list is only provisioned by network. CSG provisioning can be carried out by Open Mobile Alliance Device Management (OMA DM) procedures or by Over-The-Air (OTA) technologies. NAS procedures are also used for CSG provisioning in case of manual CSG selection, where CSG white-list can be updated during e.g. attach or tracking area update procedure.

Both "Allowed CSG list" and "Operator CSG list" consist of a list of entries which of each comprises a CSG identity and a PLMN identity that is associated with the CSG identity in the same entry. The UE considers that the CSG identity stored in CSG white-list is valid only within the scope of associated PLMN.

MDT (Minimization of Driving Tests) will be described.

Instead of performing drive test to measure quality of a cell by using a vehicle conventionally by business operators to optimize cell coverage, MDT allows a UE to perform measurement and report the result. The coverage varies according to a location of a base station, disposition of surrounding buildings, and a usage environment of a user. Thus, a business operator is required to periodically perform drive testing, which incurs a great amount of costs and resources. Thus, in order to overcome such shortcomings, MDT allowing a business operator to measure coverage by using a terminal is proposed.

A business operator may create a coverage map indicating service availability and a distribution of quality of service over the general regions in which the business operator provides services by synthesizing MDT measurement values received from several UEs, and utilize the same for network operation and optimization. For example, when the business operator receives a report on a coverage issue of a particular area from a UE, the business operator increases transmission power of a BS providing a service of the corresponding area to extend coverage of the corresponding area cell. Through this method, time and costs for network optimization can be minimized.

MDT was made based on a framework having a tracking function as one of tools of an operator for OAM (operation, administration, and maintenance). The tracing function provides ability to an operator to trace and log behaviors of a UE, making it possible to determine a major cause of a defective function of a UE. Traced data is collected by a network, which is called a TCE (trace collection entity). The operator uses data collected by the TCE for the purpose of analysis and evaluation. The tracing function used for MDT includes signaling based on the tracing function and a management based on the tracing functions. The tracing function-based signaling is used to activate an MDT operation toward a particular UE, while the tracing function-based management is used to activate an MDT operation without being limited to a particular UE.

MDT may be divided into two types of MDTs; a logged MDT and an immediate MDT according to whether or not a UE reports measured or stored log data in non-real time or in real time. The logged MDT is a method that a UE performs MDT measurement, logs corresponding data, and transmits the same to a network later. Meanwhile, the immediate MDT is a method that a UE performs MDT measurement and immediately transmits corresponding data to a network. According to the logged MDT, the UE performs MDT measurement in an RRC idle state, while according to the immediate MDT, the UE performs MDT measurement in an RRC connected state.

Figure 14:
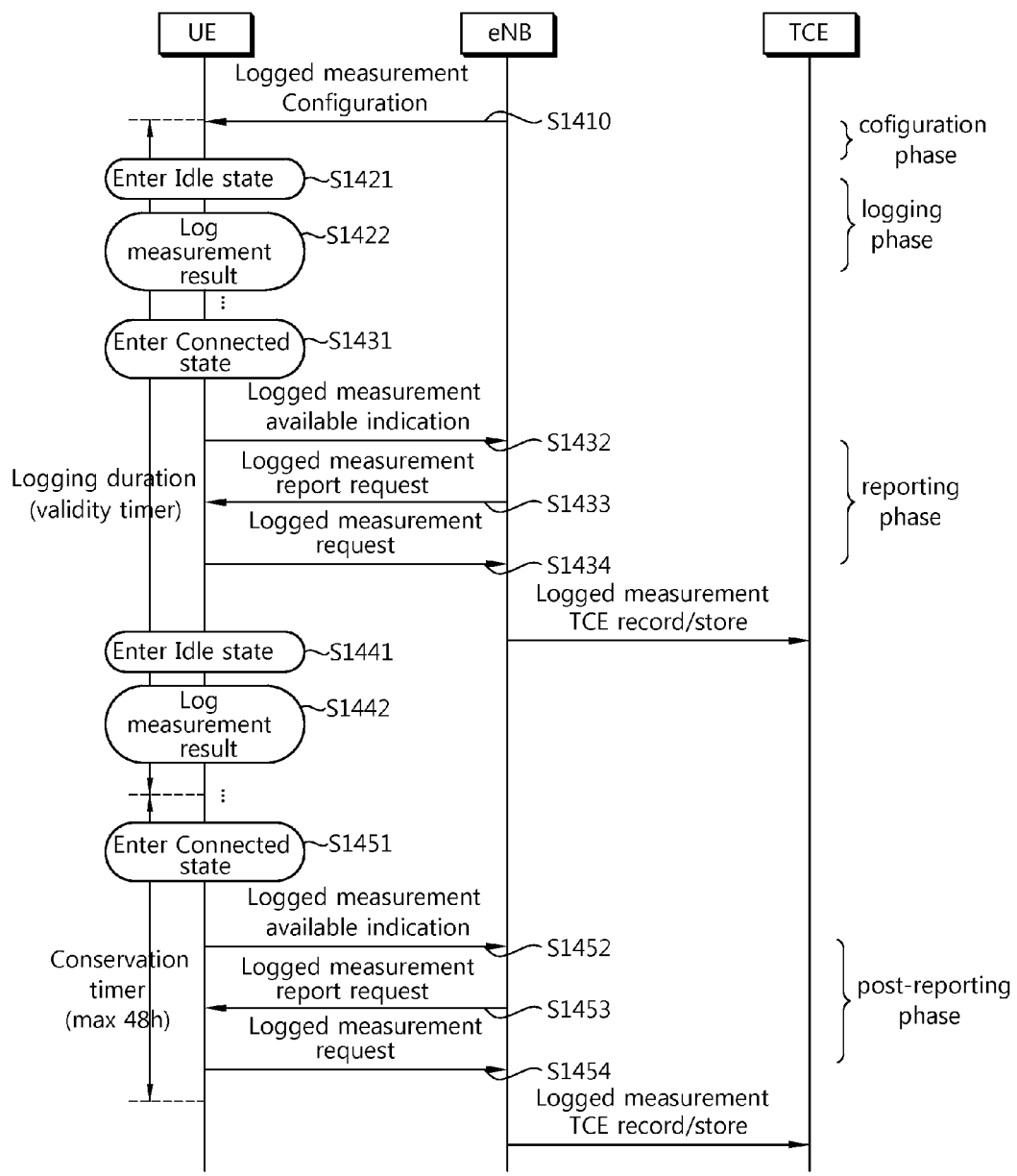
FIG. 14 is a flow chart illustrating a method for performing logged MDT.

FIG. 14 is a flow chart illustrating a method for performing logged MDT.

Referring to FIG. 14, a UE receives a logged measurement configuration (S1410). The logged measurement configuration may be included in an RRC message and transmitted on a downlink control channel. The logged measurement configuration may include at least one of reference time information, a logging duration, a logging interval, information regarding an area configuration. The logging interval indicates an interval storing a measurement result. The logging duration indicates a duration in which a UE performs logged MDT. The reference time indicates a time as a reference of a continuation time during the logged MDT is performed. The area configuration indicates an area required for the UE to perform logging.

Meanwhile, when the UE receives the logged measurement configuration, it starts a validity timer. The validity timer refers to a lifetime of the logged measurement configuration, which may be specified by information regarding the logging duration. The duration of the validity timer may indicate validity of measurement results of the UE, as well as the valid lifetime of the logged measurement configuration.

The procedure in which the UE configures the logged measurement and various procedures are performed is called a configuration phase.

When the UE enters an RRC idle state (S1421), the UE logs the measurement result while the valid timer is being driven (S1422). The measurement result value may include RSRP, RSRQ, RSCP (received signal code power), Ec/No, or the like. Hereinafter, measurement result-logged information is called logged measurements. A temporal interval during which the UE logs the measurement results at least one or more times is called a logging phase.

Performing of logged MDT based on the logged measurement configuration by the UE may vary according to a location of the UE.

Figure 15:
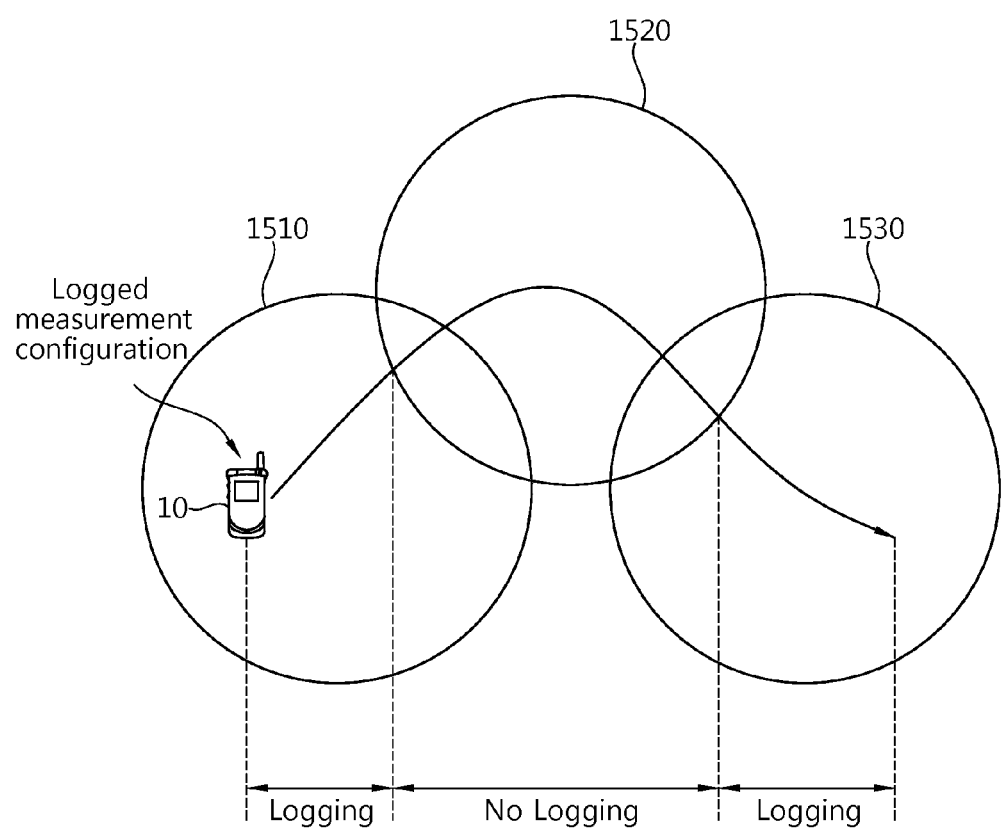
FIG. 15 illustrates logged MDT according to logging areas.

FIG. 15 illustrates logged MDT according to logging areas.

A network may configure a logging area, an area to which a UE should log. The logging area may be expressed as a cell list or a tracking area/location area list. In case that a logging area is set for the UE, when the UE moves out of the logging area, logging is stopped.

Referring to FIG. 15, a first area 1510 and a third area 1530 are areas set as logging areas, and a second area 1520 is an area in which logging is not allowed. The UE performs logging in the first area 1510, while the UE does not perform logging in the second area 1520. When the UE moves from the second area 1520 to the third area 1530, the UE performs logging again.

Figure 16:
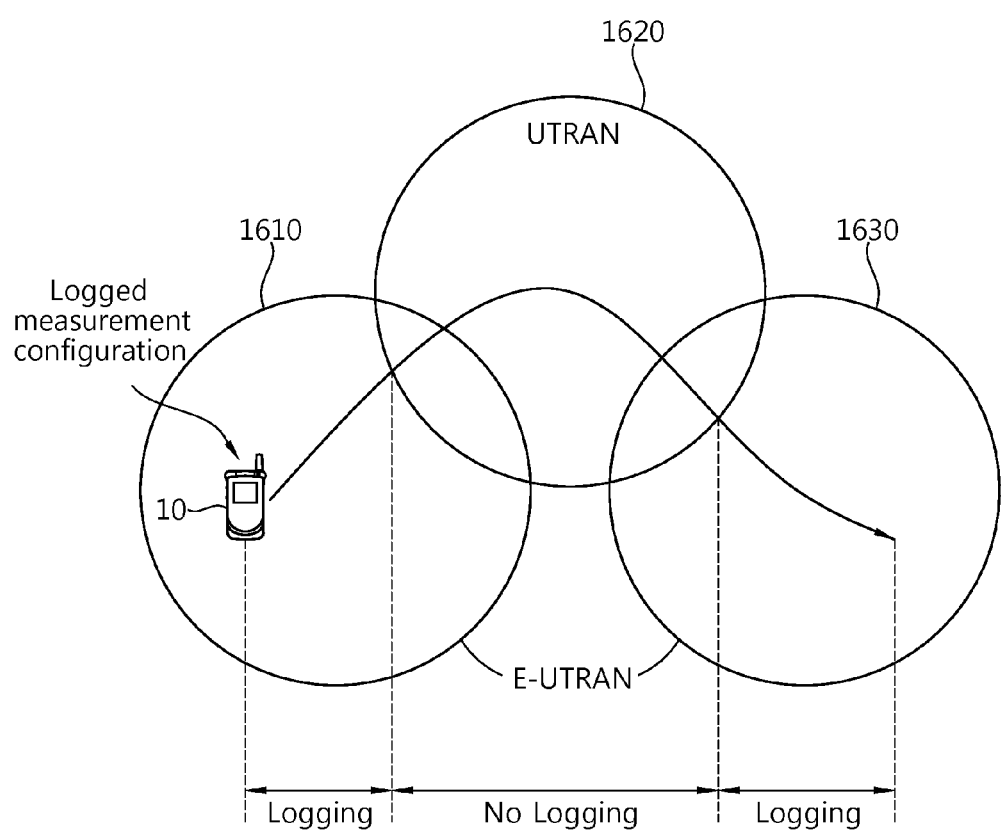
FIG. 16 illustrates logged MDT according to a change in RAT.

FIG. 16 illustrates logged MDT according to a change in RAT.

A UE performs logging only when it camps on in an RAT in which a logged measurement configuration is received, and stops logging in a different RAT. The UE may log cell information of a different RAT other than the RAT in which the UE is camped on.

A first area 1610 and a third area 1630 are E-UTRAN areas, and a second area 1620 is a UTRAN area. The logged measurement configuration is received from the E-UTRAN. When the UE enters the second area 1620, it does not perform MDT measurement.

Referring back to FIG. 14, the UE enters the RRC-connected state (S1431), and when there is a logged measurement to be reported, the UE informs the BS that there is a logged measurement to be reported (S1432). The UE may inform the BS that there is a logged measurement when an RRC connection is established, when an RRC connection is re-established, or when an RRC connection is reconfigured. Also, when the UE performs handover, the UE may inform a handover target cell that there is a logged measurement. When the UE informs the BS that there is a logged measurement, the UE may include a logged measurement availability indicator as indication information indicating that there is a logged measurement in an RRC message to be transmitted to the BS, and transmits the same. The RRC message may be an RRC connection configuration complete message, an RRC connection reestablishment complete message, an RRC reconfiguration complete message, or a handover complete message.

When the BS receives a signal indicating that there is a logged measurement from the UE, the BS requests the UE to report on the logged measurement (S1433). In requesting the UE to report on the logged measurement, the BS may include a logged measurement report request parameter regarding corresponding instruction information in an RRC message and transmit the same. The RRC message may be a UE information request message.

When UE receives the request for reporting the logged measurement from the BS, the UE reports the logged measurement to the BS (S1434). When reporting the logged measurement to the BS, the UE may include logged measurement report including logged measurements in an RRC message and transmit the same. The RRC message may be a UE information report message. When reporting the logged measurement, the UE may report the entire logged measurements of the UE at the timing of report to the BS or some of the logged measurements to the BS. When the UE reports some of the logged measurements, the reported logged measurements may be discarded.

The process in which the UE informs the BS that there is a logged measurement, receives a request for reporting the logged measurement from the BS, and the UE reports the logged measurement to the BS is called a reporting phase.

While the logged MDT is being performed, the UE largely measures a radio environment. The MDT measurement may include a cell identity, a signal quality and/or signal strength of a cell. The MDT measurement may include a measurement time and a measurement place. A table below illustrates content the UE logs.

TABLE 4

| Parameter(set) | Description |
| --- | --- |
| Serving cell identity | Global cell identity of serving cell |
| Measured results of serving cell | Measured Reference Signal Received Power (RSRP) of serving cell<br>Measured Reference Signal Received Quality (RSRQ) of serving cell |
| Measured results of neighbor cell | Cell Identities of measured of E-UTRA cells, Measured results of E-UTRA cells<br>Cell Identities of measured UTRA cells, Measured results of UTRA cells<br>Cell Identities of measured GERAN cells, Measured results of GERAN cells<br>Cell Identities of measured CDMA 2000 cells, Measured results of CDMA 2000 cells |
| Time stamp | The moment of logging measurement results, calculated as {current time minus absoluteTimeStamp} in seconds |
| Location information | Detailed location information at the moment of logging |

Information logged at each different logging timing may be stored such that it is discriminated by different log entries as follows.

Figure 17:
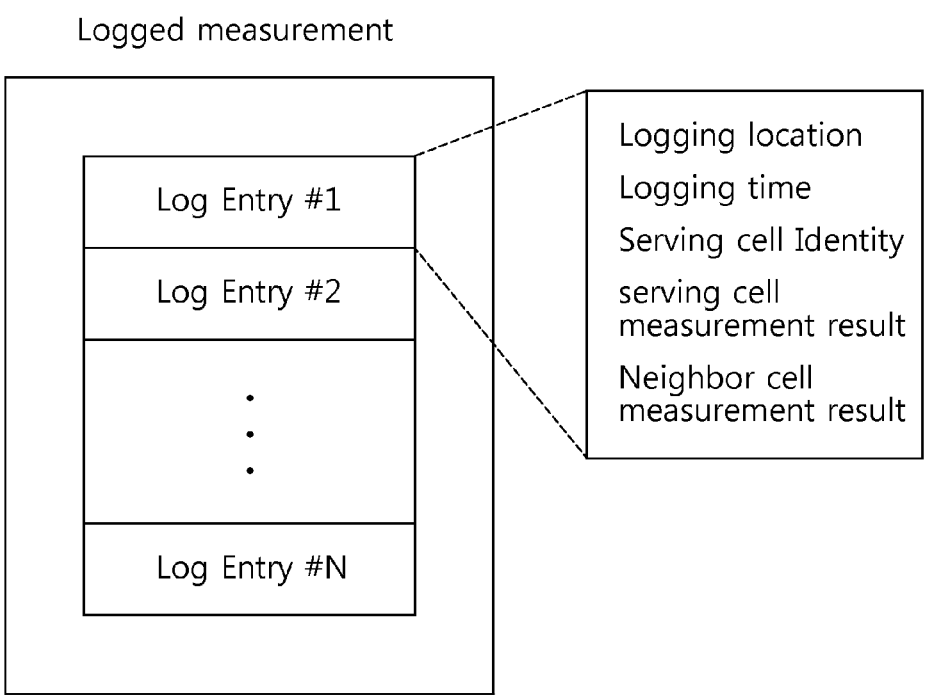
FIG. 17 illustrates logged measurement.

FIG. 17 illustrates logged measurement.

The logged measurement includes one or more log entries.

The log entries include a logging location, a logging time, a serving cell identity, a serving cell measurement result, and a neighbor cell measurement result.

The logging location indicates a location measured by the UE. The logging time indicates a time measured by the UE. Information logged at a different logging time is stored in a different log entry.

The serving cell identity may include a cell identity in a layer 3, which is called a GCI (Global Cell Identity). The GCI is a set of a PCI (Physical Cell Identity) and a PLMN.

Meanwhile, the UE may analyze indicators related to performance of the UE in addition to a radio environment and perform logging. For example, the indicators may include throughput, an erroneous transmission/reception rate, and the like.

Referring back to FIG. 14, the foregoing logging phase and the reporting phase may exist within the logging duration a plurality of times (S1441, S1442).

When the BS receives a report on the logged measurement, the BS may record/store it in a TCE.

After the validity timer expires, namely, when a logging duration has lapsed, if the UE has a logged measurement not reported yet, the UE may perform a procedure for reporting it to the BS. A procedure in which various procedures are performed is called a post-reporting phase.

When the logging duration is terminated, the UE discards the logged measurement configuration and starts a conservation timer. After the logging duration is terminated, the UE stops the MDT measurement. However, an already logged measurement is not discarded but maintained. The conservation timer indicates a lifetime of the remaining logged measurement.

When the UE enters the RRC-connected state before the conservation timer expires (S1451), the UE may report the logged measurement not reported yet to the BS. In this case, the foregoing procedure for reporting the logged measurement may be performed (S1452, S1453, S1454). When the conservation timer expires, a remaining logged measurement may be discarded. When the BS receives a report on the logged measurement, the BS may record/store it in the TCE.

The conservation timer may be previously set as a predetermined value in the UE. For example, a value of the conservation timer may be 48 hours. Alternatively, the value of the conservation timer may be included in the logged measurement configuration and transferred to the UE, or may be included in a different RRC message and transferred to the UE.

Meanwhile, when a new logged measurement configuration is transferred to the UE, the UE may update an existing logged measurement configuration with the newly obtained logged measurement configuration. In this case, the validity timer may start again from a point in time at which the logged measurement configuration is newly received. Also, the logged measurement based on the previous logged measurement configuration may be discarded.

Figure 18:
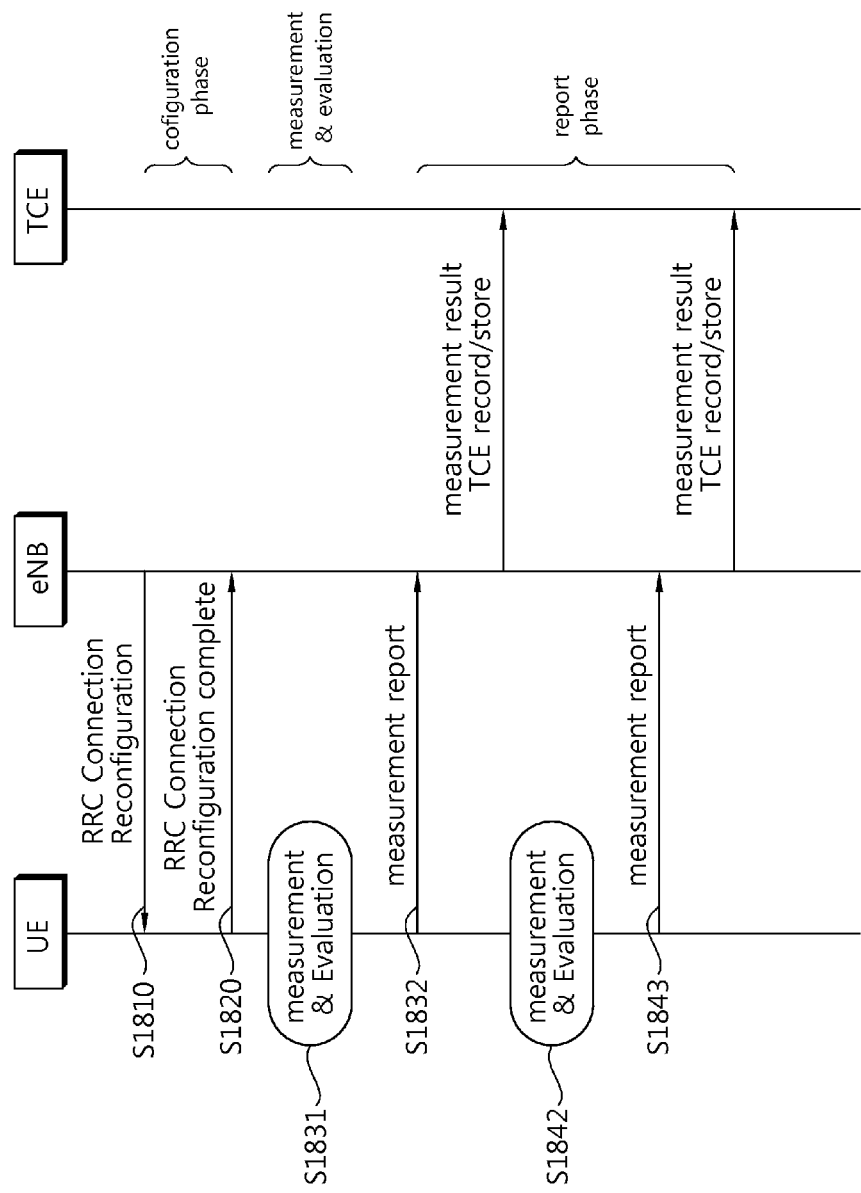
FIG. 18 illustrates the immediate MDT.

FIG. 18 illustrates the immediate MDT. The immediate MDT is based on an RRM (radio resource management) measurement and report mechanism, and in the event of additional measurement report, information regarding a location is added and reported to the BS.

Referring to FIG. 18, the UE receives an RRC connection reconfiguration message (S1810), and transmits an RRC connection reconfiguration complete message (S1820). Through this, the UE enters an RRC-connected state. The UE may receive a measurement configuration by receiving the RRC connection reconfiguration message. The measurement configuration in the illustration of FIG. 18 is received through an RRC connection reconfiguration message, but it may also be included in a different RRC message and transmitted.

The UE performs a measurement and evaluation in the RRC-connected state (S1831) and reports the measurement result to the BS (S1832). In the immediate MDT, the measurement result may be able to provide accurate location information, if possible, as in the illustration of the GNSS (global navigation satellite system) location information. For a location measurement such as an RF fingerprint, neighbor cell measurement information that may be used for determining a location of the UE may also be provided.

In FIG. 18, it can be seen that, even after the measurement and evaluation (S1831) and report (S1832) performed first, the UE performs measurement and evaluation (S1841) and reports the measurement result to the BS (S1842). This is a significant difference of the immediate MDT over the logged MDT.

An ICIC (Inter-cell Interference Coordination) will be described.

The ICIC is an operation of managing radio resource such that inter-cell interference can be controlled. The ICIC mechanism may be divided into a frequency domain ICIC and a time domain ICIC. The ICIC includes a multi-cell RRM (Radio Resource Management) function that requires consideration of information from multiple cells.

An interfering cell is a cell providing interference. The interfering cell is also called an aggressor cell.

An interfered cell is a cell interfered by the interfering cell. The interfered cell is also called a victim cell.

The frequency domain ICIC coordinates the use of resource (e.g., an RB (resource block)) of the frequency domain among multiple cells.

The time domain ICIC coordinates the use of resources (e.g., suframes0 among multiple cells. For the time domain ICIC, an OAM (Operations, Administration and Maintenance) configuration called an ABS (Almost Blank Subframe) pattern may be used. An ABS in an interfering cell is used to protect resource in a subframe of an interfered cell that receives strong inter-cell interference. The ABS is a subframe having reduced transmission power (or zero transmission power) or reduced activity in a physical channel.

An ABS-based pattern is known to a terminal, and restricts a terminal measurement. This is called a measurement resource restriction. An ABS pattern refers to information indicating which subframe is an ABS in one or more radio frames.

There are three types of measurement resource restriction patterns according to a measured cell (e.g., a serving cell or a neighbor cell) and a measurement type (e.g., RRM (Radio Resource Management), RLM (Radio Link Measurement), CSI (Channel State Information)).

'ABS pattern 1' is used to limit RRM/RLM measurement resource of a serving cell. Information regarding the ABS pattern 1 may be provided by a BS to a UE when the RB is configured/corrected/released or when a configuration of MAC/PHY is corrected.

'ABS pattern 2' is used to limit resource of RRM measurement of a neighbor cell operating in the same frequency as that of a serving cell. Thus, as for the ABS pattern 2, a list of neighbor cells to be measured, as well as pattern information, may be provided to a UE. The ABS pattern 2 may be included in measurement configuration with respect to a measurement object.

'ABS pattern 3' is used to limit resource with respect to a CSI measurement of a serving cell. The ABS pattern 3 may be included in a message for configuring a CSI report.

For ICIC, two scenarios, i.e., a CSG scenario and a pico scenario, are considered.

Figure 19:
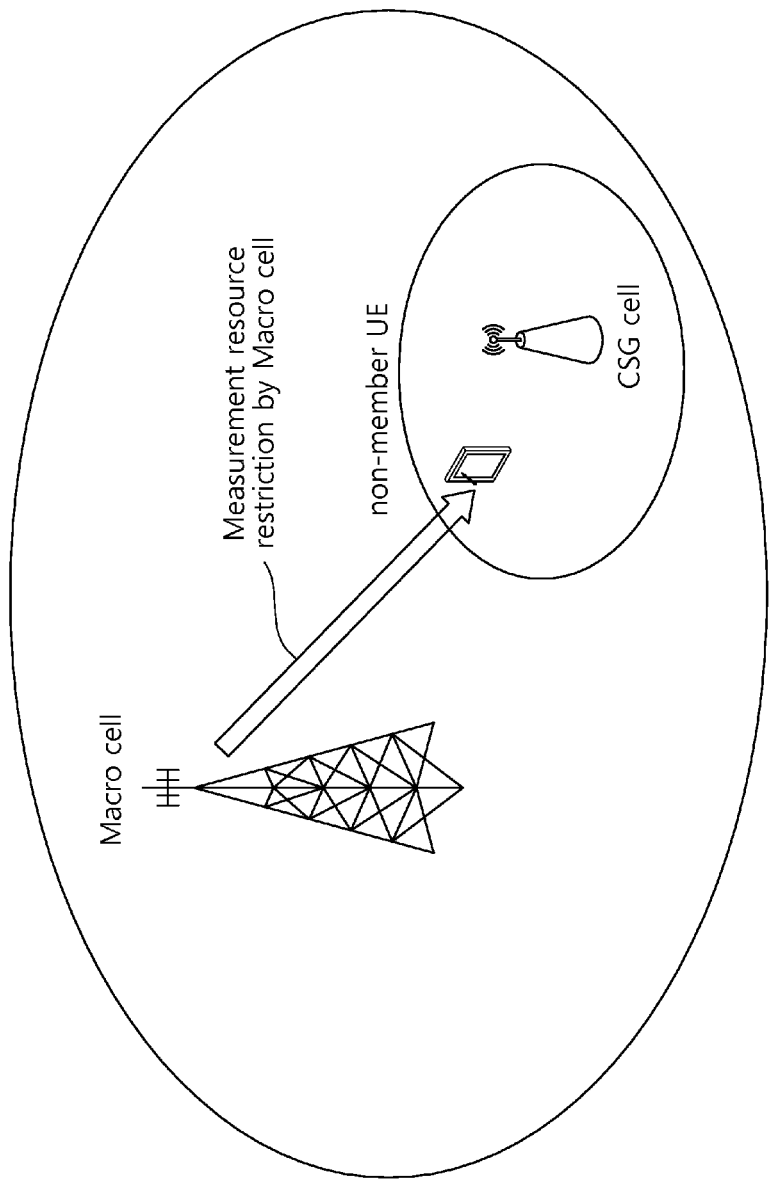
FIG. 19 illustrates a CSG scenario.

FIG. 19 illustrates a CSG scenario.

A CSG cell refers to a cell only a particular subscribe is accessible. A non-member UE is a UE which is not a member of the CSG cell and cannot access the CSG cell. A CSG cell a UE cannot access is called a non-member CSG cell. A macro-cell refers to a serving cell of a non-member UE. Coverage of a CSG cell and that of a macro-cell overlap partially or entirely.

A primary interference condition is generated when a non-member UE is located in close proximity of a CSG cell. In the position of the non-member UE, the interfering cell is a CSG cell and the macro-cell is an interfered cell. The time domain ICIC is used to allow the non-member UE to be continuously provided with a service.

In an RRC-connected state, when a non-member UE is discovered to be strongly interfered by a CSG cell, the network may set a measurement resource restriction. Also, in order to facilitate mobility from a macro-cell, the network may set RRM measurement resource restriction with respect to a neighbor cell. When the UE is not severely interfered by the CSG cell any longer, the network may release the RRM/RLM/CSI measurement resource restriction.

The UE may use a measurement resource restriction set for RRM, RLM, and CSI measurements. Namely, the UE may use resource for RLM in ABS, and perform a measurement for RLM and CSI measurement in the ABS.

The network may configure such that a CSG cell does not use low-interference radio resource according to the set measurement resource restriction. Namely, the CSG cell may not transmit nor receive data in the ABS.

Figure 20:
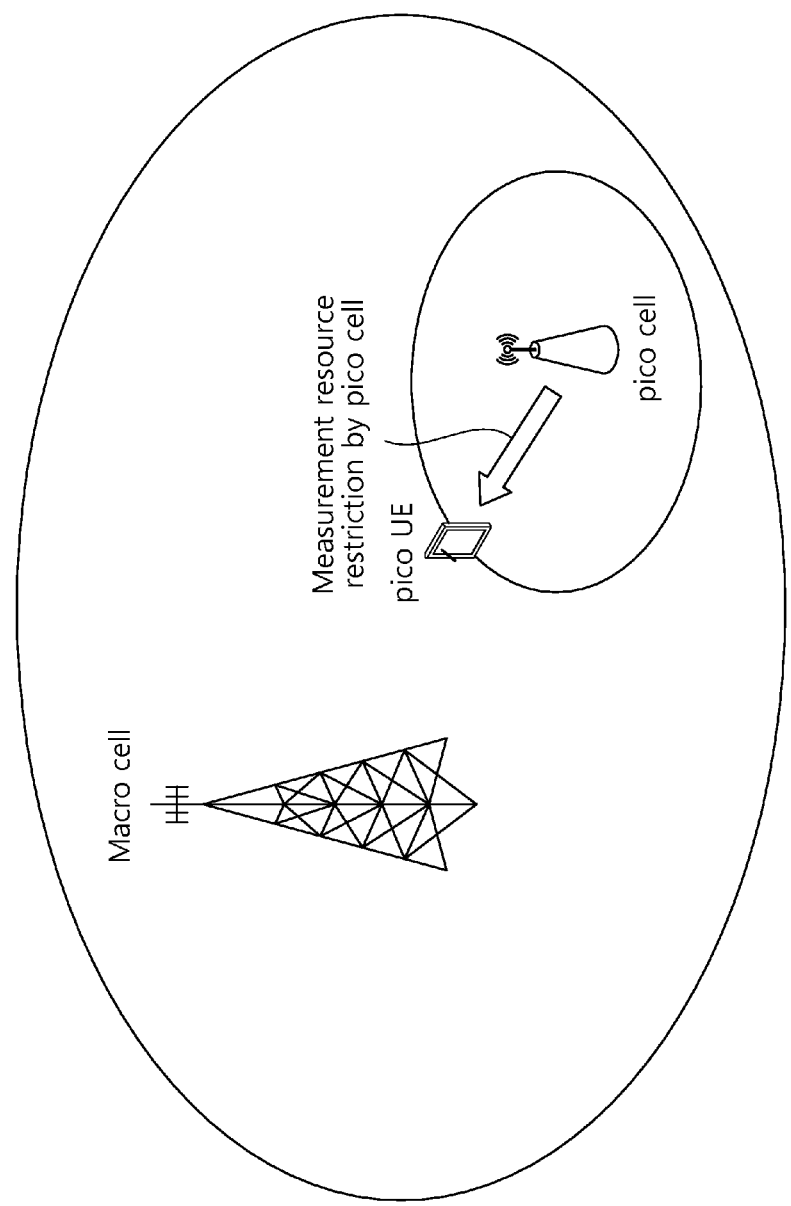
FIG. 20 illustrates a pico-scenario.

FIG. 20 illustrates a pico-scenario.

A pico-cell is a serving cell of a UE. The pico-cell is a cell whose cover overlaps partially or entirely with that of a macro-cell. In general, the pico-cell may have coverage smaller than that of the macro-cell, but the present invention is not limited thereto.

A primary interference condition is generated when a pico-UE is located in an edge of a pico-serving cell. In the position of the pico-UE, a macro-cell is an interfering cell, and the pico-cell is an interfered cell. The time ICIC is used to allow the pico-UE to be continuously provided with a service in the pico-cell.

When the pico-cell is discovered to belong to be strongly interfered by the macro-cell, the pico cell may set a measurement resource restriction to the corresponding UE.

The pico-UE may use a measurement resource restriction set for the RRM, RLM, and CSI measurements. Namely, the pico-UE may use resource for RLM in the ABS and perform measurement for RLM and CSI measurement in the ABS. When the pico-cell is strongly interfered by the macro-cell, RRM/RLM/CSI measurement may be more accurately performed in the ABS.

Also, when a UE using a macro-cell as a serving cell performs neighbor cell measurement in the ABS, mobility from the macro-cell to the pico-cell may be facilitated.

The UE may perform RRM measurement such as RSRP (Reference Signal Received Power), RSRQ (Reference Signal Received Quality), measurement of quality such as a CQI (Channel Quality Indicator), and a path-loss measurement with respect to a serving cell or a neighbor cell. Also, the UE may perform measurement aiming at RLM (Radio Link Monitoring) to monitor a connection with the serving cell.

The ABS pattern may be implemented by a bit map having a particular length. The first (leftmost) bit corresponds to the subframe #0 of the radio frame satisfying SFN mod x=0, where SFN is that of PCell and x is the size of the bit string divided by 10. "1" denotes that the corresponding subframe is used for measurement. When the UE performs measurement by using low-interference radio resource according to the set measurement resource restriction, the UE may set such that only a subframe indicated by 1 in the ABS pattern is used for measurement.

Hereinafter, IDC (in-device coexistence) will be described.

In order for a user to access various networks any time at any place, a single terminal may include a GNSS (global navigation satellite system) receiver, including a transceiver for a wireless communication system such as LTE, WiFi, Bluetooth (BT), and the like. For example, there may be a terminal including LTE and BT modules to receive a VoIP service and a multimedia service, a terminal including LTE and WiFi modules for a traffic distribution, a terminal including GNSS and LTE modules in order to additionally obtain location information, and the like.

In this case, since several transceivers are in proximity within a single UE, strength of power transmitted from one transmitter may be greater than that of reception power of a different receiver. Generation of IDC interference between two transceivers may be prevented through a filtering technique or by spacing usable frequencies. However, when several wireless communication modules operate in adjacent frequencies in a single terminal, a current filtering technique is not able to sufficiently cancel interference. The foregoing problem is required to be addressed to allow transceivers for a plurality of wireless communication modules within a UE to coexist in the future.

Figure 21:
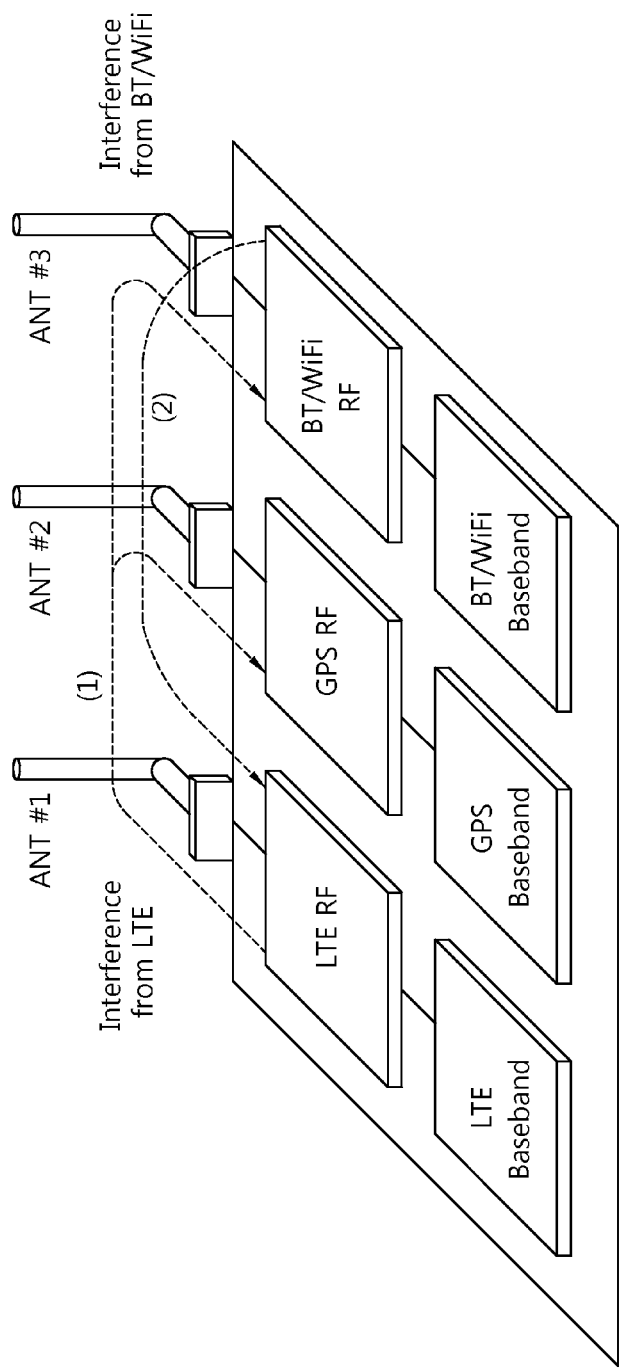
FIG. 21 illustrates a situation in which mutual interference may be generated in an IDC environment in which LTE, GPS, and BT/WiFi modules coexist in a single UE.

FIG. 21 illustrates a situation in which mutual interference may be generated in an IDC environment in which LTE, GPS, and BT/WiFi modules coexist in a single UE.

IDC avoidance is divided into three modes according to whether or not the LTE module is coordinated with a different communication module in coexistence or whether or not the LTE module is coordinated with a BS in order to solve IDC interference. A first mode is a mode in which there is no coordination for IDC interference avoidance between coexisting communication modules and between the LTE and a network. In this case, the LTE module does not have information regarding the different communication module in coexistence, so it cannot properly handle a degradation of quality of service (QoS) due to IDC interference. A second mode is a mode in which coexisting communication modules are coordinated with each other within a UE. In this mode, coexisting modules may know an on/off state, a traffic transmission state, and the like, of the mutual counterpart modules. However, there is no coordination between the UE and the network. A third mode is a mode in which there is coordination between the UE and the network, as well as between the coexisting modules within the UE. In this mode, the coexisting modules may know an on/off state, a traffic transmission state, and the like, of the mutual counterpart modules, and since the terminal informs the network about the IDC interference state, the network may make a determination to avoid IDC interference and take measures.

The LTE module may measure IDC interference through inter/intra frequency measurement, as well as coordination with different modules within the UE.

Interference may be IDC interference generated as different communication modules operate in coexistence within a single UE, and IDC interference may be generated in coexistence situations as follows.

Interference is generated in a situation in which LTE and WiFi coexist.

Interference is generated in a situation in which LTE and BT coexist.

Interference is generated in a situation in which LTE and GNSS coexist.

In the aspect of frequency, the communication modules operate in the following adjacent frequencies to make mutual interference.

The LTE TDD may operate in a band 40 (2300 MHz~2400 MHz), and the WiFi and BT may operate in an unlicensed band (2400 MHz~2483.5 MHz). In this case, transmission of the LTE may interfere with the WiFi and BT, and transmission of the WiFi or BT may interfere with reception of the LTE.

The LTE FDD may perform uplink transmission in a band 7 (2500 MHz~2700 MHz), and the WiFi and BT may operate in the unlicensed band (2400 MHz~2483.5 MHz). In this case, uplink transmission of the LTE may interfere with reception of the WiFi or BT.

The LTE FDD may perform uplink transmission in a Band 13 (UL: 777-787 MHz, DL: 746-756 MHz) or Band 14 (UL: 788-798 MHz, DL: 758-768 MHz), and GPS radio may receive in 1575.42 MHz. In this case, uplink transmission of the LTE may interfere with reception of the GPS.

Currently, 3GPP considers two directions in order to solve IDC interference. A first one is a method in which an interfering communication module or an interfered communication module changes a frequency ((Frequency Division Multiplexing (FDM)). A second one is a method in which coexisting communication modules divide time to use a single frequency (Time Division Multiplexing (TDM)). In order to allow a BS to solve IDC interference generated in a terminal through the foregoing methods, the terminal provides information required for the BS to perform FDM/TDM, to the BS, when IDC interference is generated. The required information includes a frequency in which IDC interference is generated, pattern information for performing the TDM, and the like.

If the storage space allocated for logging is full while the UE is performing logged MDT measurements and this causes a lack of storage space, the UE may stop the logging operation and discard the previously received logged measurement configuration. Since there is no logged measurement configuration, the UE does not perform logged MDT measurements according to a logged measurement configuration.

Moreover, the network is not aware of whether the logged MDT measurements performed by the UE are stopped or not. It is not also aware of the reason for stopping logged MDT measurements. The network expects that the UE will perform measurements and logging during the duration of logging included in the existing logged measurement configuration. Therefore, the network may not signal the UE to make a new logged measurement configuration.

If the network receives a logged measurement from the UE under this circumstance, the network may not obtain as much results as required according to the logged measurement configuration, due to the stopped measurements.

To solve the above-mentioned problem, there is suggested a method of storing an importance tag by which the importance of a measurement result is determined during logging, in order to prevent a logging operation from being stopped while the logged measurement configuration is valid. If there is not enough storage space allocated for logging, the UE may continue logging while overwriting an existing logged measurement result with a new measurement result based on the importance tag.

If the UE logs a measurement result with an importance tag may, this may indicate that the importance tag indicating the importance of the measurement result is included in a log entry generated by the UE by logging the measurement result.

The importance tag may be implemented in various ways. In an example, the importance tag may be included or not in the log entry depending on the measurement result. In this case, the UE determines the importance of the measurement result upon obtaining it, and if the measurement result is so important as to be required to be reported, the UE may log both the importance tag and the measurement result in the log entry. In this case, the UE may determine whether to write the measurement result with a new measurement result depending on whether the importance tag is included in the log entry or not.

In another example, the importance tag may be implemented as a 1-bit indicator that indicates whether the measurement result is important or not. In this case, the importance tag may be logged in the log entry, together with all logged measurement results. In an implementation example of the importance tag value, '1' may indicate that the measurement result is of importance, and '0' may indicate that the measurement result is of low importance.

In yet another example, the importance tag may be implemented as a plurality of bit indicators that indicate the importance of the measurement result more specifically. Each measurement result may have a different level of importance, or the importance of a measurement result may differ according to logging location and time. Accordingly, if the importance tag is implemented as an indicator consisting of a plurality of bits, the importance tag may represent the importance of the measurement result more specifically. For example, if the importance tag is set as a 2-bit indicator, its concrete meaning may be as shown in the following Table 5.

TABLE 5

| Importance tag bit | Meaning |
|---|---|
| 00 | No importance |
| 01 | Low importance |
| 10 | Average importance |
| 11 | High importance |

Hereinafter, an embodiment of the present invention will be described by taking an example in which the importance tag is implemented as a 1-bit indicator, and the value '1' indicates that the measurement result is of importance and the value '0' indicates that the measurement result is of no importance.

Figure 22:
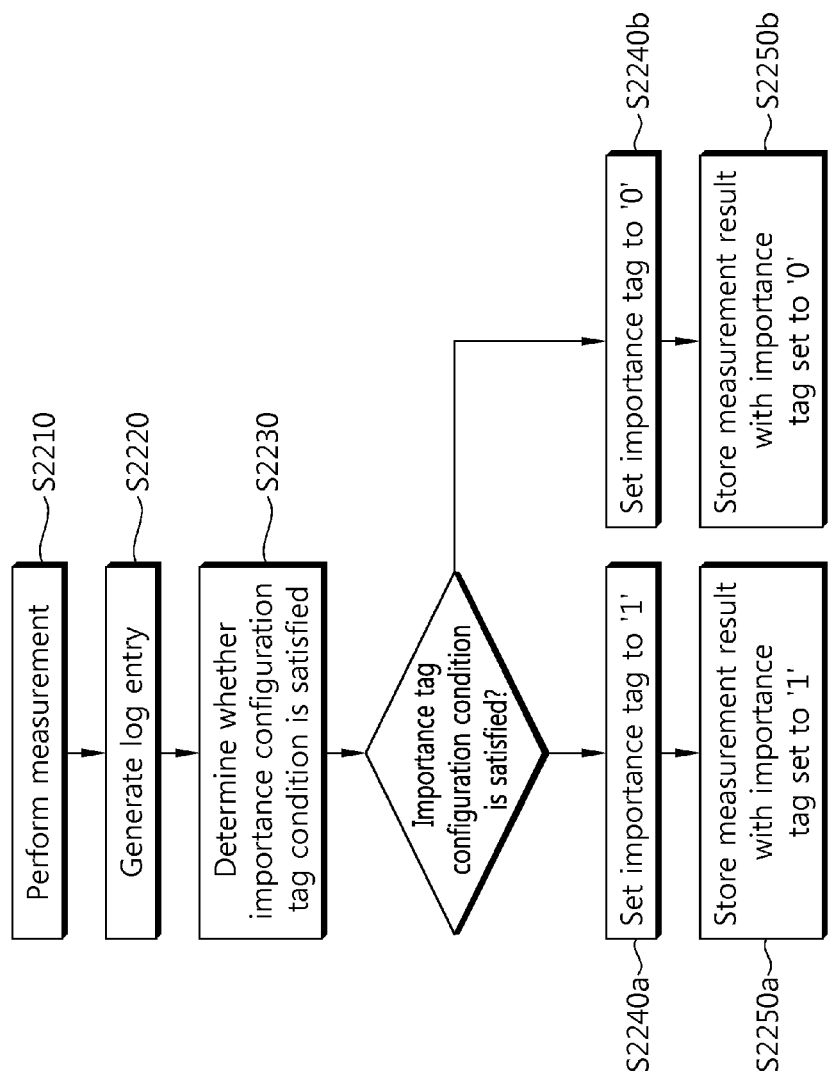
FIG. 22 is a flowchart showing a method for UE to allocate an importance tag to a measurement result according to an embodiment of the present invention.

FIG. 22 is a flowchart showing a method for UE to allocate an importance tag to a measurement result according to an embodiment of the present invention.

Referring to FIG. 22, the UE performs measurement based on a logged measurement configuration (S2210).

The UE generates a log entry containing a measurement result according to the logged measurement configuration (S2220). A basic log entry may have the structure of the log entry described in detail with reference to FIG. 17.

The UE may determine a set value of the importance tag of a measurement result when generating a log entry. The configuration of an importance tag by the UE may be performed according to the following criteria. These criteria for determination are not limited to an implementation example of an importance tag, which is the essential part of this example, but may also be applied to an example in which an importance tag is included in a measurement result of importance and an example in which an importance tag is implemented as a larger number of bits.

1. Importance Tagging is Available for Measurement/Logging that Occurs by a Specific Event.

Based on a logged measurement configuration received from the network, the UE measures the quality of a currently connected cell (a cell the UE is camping on or a serving cell) or a cell defined by the logged measurement configuration. If an event condition associated with the cell is satisfied and the quality measurement value is logged, the UE may log the measurement result with the importance tag indicating that the quality measurement result is of importance. Details of the event are as follows:

Event A1 (Serving Becomes Better than Threshold)

The UE measures the quality of a cell the UE is currently camping on, and compares it with the threshold included in the logged measurement configuration received from the network. If the quality of the camped-on cell is better than the threshold, the UE may log the identifier of the cell, the quality measurement result of the cell, and an importance tag set to '1' as well.

The UE measures the quality of a serving cell (at least one cell if the UE is connected to a plurality of cells), and compares it with the threshold included in the measurement configuration received from the network or the logged measurement configuration. If the quality of the serving cell is better than the threshold, the UE may log the identifier of the cell, the quality measurement result of the cell, and an importance tag set to '1' as well.

Event A2 (Serving Becomes Worse than Threshold)

The UE measures the quality of a cell the UE is currently camping on, and compares it with the threshold of logged measurement configuration received from the network. If the quality of the camped-on cell is worse than the threshold, the UE may log the identifier of the cell, the quality measurement result of the cell, and an importance tag as well.

The UE measures the quality of a serving cell (at least one cell if the UE is connected to a plurality of cells), and compares it with the threshold included in the measurement configuration received from the network or the logged measurement configuration. If the quality of the serving cell is worse than the threshold, the UE may log the identifier of the cell, the quality measurement result of the cell, and an importance tag set to '1' as well.

Event A3 (Neighbor Becomes Offset Better than PCell)

The UE measures the quality of a currently connected serving cell (PCell if the US is connected to a plurality of serving cells), and measures the quality of a cell operating on the frequency of a measurement object associated with Event A3. If the quality of the cell is better than (PCell quality+Offset), the UE may log the identifier of the cell, the quality measurement result of the cell, and an importance tag set to '1' as well. The offset value may be included, for each frequency, in the measurement configuration and/or the logged measurement configuration.

Event A4 (Neighbor Becomes Offset Better than Threshold)

The UE measures the quality of a cell having a different frequency from a currently connected serving cell and operating on the frequency of a measurement object associated with Event A4. If the quality of the cell is better than the threshold included in the measurement configuration or the logged measurement configuration, the UE may log the identifier of the cell, the quality measurement result of the cell, and an importance tag set to '1' as well.

Event A5 (PCell Becomes Worse than Threshold) and Neighbor Becomes Better than Threshold2)

The UE measures the quality of a currently connected serving cell (PCell if the US is connected to a plurality of serving cells), and compares the quality of the PCell with the threshold included in the measurement configuration or the logged measurement configuration. If the PCell quality is worse than the threshold, the UE measures the quality of a cell operating on the frequency of a measurement object associated with Event A5. If the quality of the cell is better than the threshold defined in the measurement configuration or the logged measurement configuration, the UE may log the identifier of the cell, the quality measurement result of the cell, and an importance tag set to '1' as well.

Event A6 (Neighbor Becomes Offset Better than SCell)

If the UE is connected to a plurality of serving cells, it measures the quality of a SCell and measures the quality of a cell operating on the frequency of a measurement object associated with Event A6. If the quality of the cell is better than the SCell quality, the UE may log the identifier of the cell, the quality measurement result of the cell, and an importance tag set to '1' as well.

Event B1 (Inter RAT Neighbor Becomes Better than Threshold)

The UE measures the quality of a cell operating on the frequency of a measurement object associated with Event B1, and compares the quality of the cell with the threshold included in the measurement configuration or the logged measurement configuration. If the cell quality is better than the threshold, the UE may log the identifier of the cell, the quality measurement result of the cell, and an importance tag set to '1' as well.

Event B2 (PCell Becomes Worse than Threshold) and Inter RAT Neighbor Becomes Better than Threshold2)

The UE measures the quality of a currently connected serving cell (PCell if the US is connected to a plurality of serving cells), and compares the quality of the PCell with the threshold defined in the measurement configuration. If the PCell quality is worse than the threshold, the UE measures the quality of a cell operating on the frequency of a measurement object associated with Event B2. If the quality of the cell is better than the threshold included in the measurement configuration or the logged measurement configuration, the UE may log the identifier of the cell, the quality measurement result of the cell, and an importance tag as well.

2. If Cell Quality is Less than a Specific Value.

Based on a logged measurement configuration received from the network, the UE measures the quality of a cell the UE is camping on or the quality of a cell defined by the logged measurement configuration. When logging a measurement result, if the quality measurement value of the cell is less than a specific value (threshold value) defined in the logged measurement configuration, the UE may log the measurement result with an importance tag set to '1'.

3. If Geographical Location Information is Logged as Well when Logging a Measurement Result.

Based on a logged measurement configuration received from the network, the UE measures the quality of a cell the UE is camping on or the quality of a cell defined by the logged measurement configuration. When logging a measurement result along with geographical location information, the UE may log the measurement result with an importance tag set to '1'. Additionally, if the geographical location information is location information obtained from a GNSS (Global Navigation Satellite System), the UE may log the measurement result with an importance tag set to '1'. Further, when the location information obtained from the GNSS is provided along with accuracy information, if the accuracy information is greater than a specific accuracy level (e.g., within 50 m), the UE may log the measurement result with an importance tag set to '1'.

4. If a Measurement Result the UE Wants to Log is a Result of Measurement Performed in a Specific Environment.

If the UE performs measurement under the condition that in-device transmission is detected, the UE may log the measurement result with an importance tag set to '0'. By this, the measurement result affected by the in-device transmission is set to be of no importance, so that another measurement result of importance is reported more preferentially than the affected measurement result.

5. If a Measurement Result the UE Wants to Log is a Measurement Result Measured Through Wireless Resources Allocated for a Specific Purpose.

If the UE performs measurement through a subframe for MBMS or through a low-interference wireless resource, such as ABS, the UE may log the measurement result with an importance tag set to '1'. The subframe for MBMS is a wireless resource for a specific service, and a measurement result for this service may be reported more preferentially than other measurement results. Moreover, a measurement result measured through the low-interference wireless resource is a measurement result not affected by interference, and may be reported more preferentially than other measurement results to achieve an efficient operation of the network.

Referring again to FIG. 22, the UE determines whether the measurement result satisfies the above-described importance tag configuration condition (S2230).

If the measurement result satisfies the importance tag configuration condition, the UE sets the importance tag to '1' (S2240a), and logs the measurement result with the importance tag in the log entry (S2250a).

On the other hand, if the measurement result does not satisfy the importance tag configuration condition, the UE sets the importance tag to '0' (S2240b), the UE logs the measurement result with the importance tag in the log entry (S2250b).

The above-mentioned implementation of an importance tag is merely an example. That is, the UE may determine whether to log the measurement result with an importance tag in the log entry or not, depending on the importance of the measurement result. In an example, if the measurement result satisfies the importance tag configuration condition, the UE may log the measurement result with an importance tag in the log entry in the steps S2240a and S2250a. On the other hand, if the measurement result does not satisfy the importance tag configuration condition, the UE may log the measurement result with no importance tag in the log entry, unlike in the steps S2240b and S2250b.

Moreover, under an environment where the importance of the measurement value can be subdivided, the step S2230 may be a step in which the UE determines the importance of the measurement result. Afterwards, the UE may log the measurement result with an importance tag set to a specific value in the log entry depending on the importance of the measurement result.

If the memory is full during a measurement/logging operation, the UE compares the importance of a new measurement result with the importance of existing logged measurement results. Based on this, the UE may determine whether to log the new measurement result or not. The UE may determine whether to log a measurement result or not according to the implementation of an importance tag.

Figure 23:
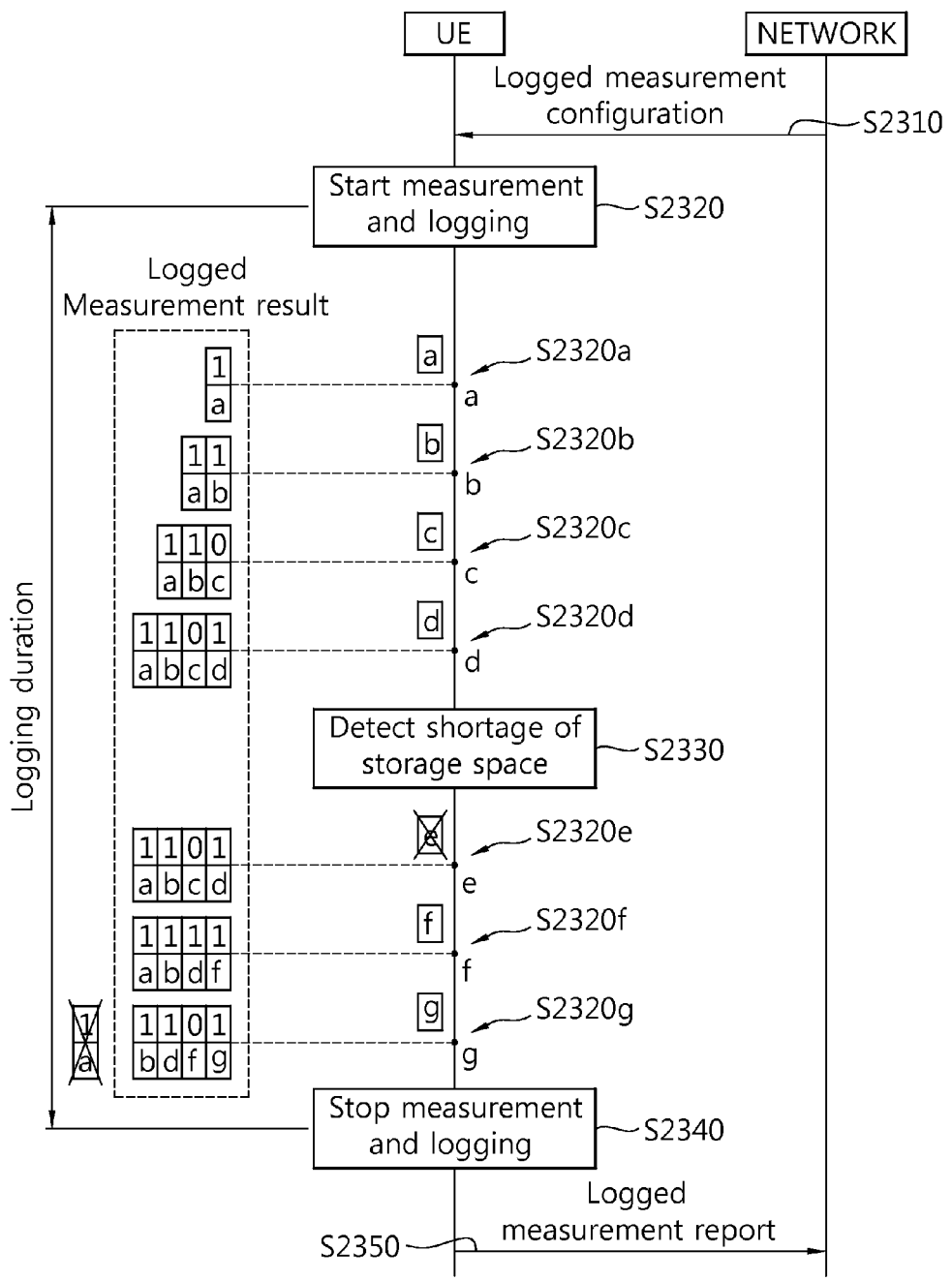
FIG. 23 is a view showing an example of a method for logging a measurement result according to an embodiment of the present invention.

FIG. 23 is a view showing an example of a method for logging a measurement result according to an embodiment of the present invention. In the example shown in FIG. 23, there is illustrated a wireless communication environment in which the importance tag is implemented to indicate that the measurement result is of importance if the importance tag is set to '1' and the measurement result is of no importance if the importance tag is set to '0'. Moreover, it is assumed that storage space for the UE's logging is capable of logging a maximum of four log entries.

Referring to FIG. 23, the UE receives a logged measurement configuration for performing logged MDT measurements from the network (S2310). The logged measurement configuration may include information contained in the logged measurements explained with reference to FIG. 14 and information required to determine whether to log both a measurement result and an importance tag.

The UE starts measurement and logging according to the logged measurement configuration (S2320).

The UE performs a measurement at a logging point in time 'a', logs the measurement result, and generates a log entry 'a' (S2320a). The UE determines the importance of the measurement result, and if the measurement result is determined to be of importance, the UE may log the measurement result with an importance tag set to '1' in the log entry.

The UE performs a measurement at a logging point in time 'b', logs the measurement result, and generates a log entry 'b' (S2320b). The UE determines the importance of the measurement result, and if the measurement result is determined to be of importance, the UE may log the measurement result with an importance tag set to '1' in the log entry.

The UE performs a measurement at a logging point in time 'c', logs the measurement result, and generates a log entry 'c' (S2320c). The UE determines the importance of the measurement result, and if the measurement result is determined to be of no importance, the UE may log the measurement result with an importance tag set to '0' in the log entry.

The UE performs a measurement at a logging point in time 'd', logs the measurement result, and generates a log entry 'd' (S2320d). The UE determines the importance of the measurement result, and if the measurement result is determined to be of importance, the UE may log the measurement result with an importance tag set to '1' in the log entry.

The UE detects a lack of storage space for logging (S2330). Afterwards, the UE compares the importance of a new measurement result with the importance of existing logged measurement results at the time of measurement and logging to determine whether to perform logging or not. The importance of the existing logged measurement results may be determined based on the value of the importance tag included in each log entry.

The UE performs a measurement at a logging point in time 'e', and determines the importance of the measurement result (S2320e). The UE may determine that the measurement result is of no importance. In this case, the UE may not log this new measurement result.

The UE performs a measurement at a logging point in time 'f', and determines the importance of the measurement result (S2320f). The UE determines that the measurement result is of importance for logging. In this case, the UE may discard the log entry 'c' containing the measurement result of no importance, log the new measurement result, and generate a log entry 'f' (S2320f). The generated log entry 'f' is included in the logged measurement. O the other hand, if there are a plurality of measurement results of no importance, the UE may discard the first logged log entry and log the new measurement result.

The UE performs a measurement at a logging point in time 'g', and determines the importance of the measurement result. The UE determines that the measurement result is of importance for logging. If all of the log entries included in the logged measurements include an importance tag indicating that they are of importance for logging, the UE may discard the first logged log entry and log a new importance log. Accordingly, the UE may discard the log entry 'a' and log a log entry 'g' including the new measurement result.

The UE stops measurement and logging upon the elapse of the duration of logging (S2350).

The UE transmits a logged measurement report message to the network in order to report a logged measurement to the network (S2360).

According to the example shown in FIG. 23, if the UE obtains a new measurement result of importance when there is not enough storage space for logging, it may discard a log entry of no importance and log the new measurement result. Accordingly, when the thus-obtained logged measurement is reported to the network, the network may obtain measurement results of more importance for use in network operations. Based on this, the network may perform a more efficient operation.

In the above-described example, if the measurement results included in all the log entries are of importance when there is not enough storage space, the UE discards the first logged log entry and logs a new log entry of importance. Contrariwise, if a lack of storage space is detected, and the measurement results included in all the log entries are of importance, the UE may not perform further measurement and logging.

Meanwhile, if an importance tag indicates the importance of a measurement result more specifically, the UE, having detected a lack of storage space for logging, may compare the importance of the new measurement result with the indicator value of the importance tag of a logged log entry. If the importance of the new measurement result is higher than the importance indicated by the importance tag, the UE may log the new measurement result. At this point, the UE may discard the log entry including the importance tag indicating the lowest importance. If there are a plurality of log entries to be discarded, the UE discard the first logged log entry.

Under the above-described communication environment, if only log entries each including an importance tag indicating the highest importance are included in logged measurements, and a new measurement result obtained by the UE is of the highest importance, the UE may discard the first logged log entry and log the new measurement result. However, if there is not enough storage space for logging by the network, and all the logged measurement results are of the highest importance, the UE may not perform further measurement and logging.

The UE logs a measurement result with an importance tag depending on the importance of the measurement result. If the storage space for logging is not enough, the UE compares the importance of a new measurement result with the importance of existing logged measurement results, and determine whether to perform logging or not depending on importance. The UE may preferentially log a measurement result of importance and report it to the network. By this, the UE may prevent the problem that the network does not get enough measurement results by stopping logging in the case of lack of storage space.

The UE may determine whether a measurement result is of importance or not and/or the level of importance of the measurement result, and log an importance tag as well, based on whether a specific condition is satisfied or not. Therefore, the network may preferentially obtain a measurement result satisfying the above condition, and based upon this, the performance of the network may be improved.

Figure 24:
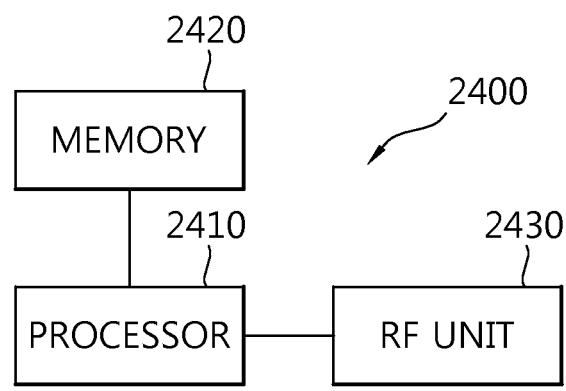
FIG. 24 is a block diagram showing a wireless device to which an embodiment of the present invention is applied.

FIG. 24 is a block diagram showing a wireless apparatus to which an embodiment of the present invention is applied. This device implements an operation of the UE according the above-described embodiment with reference to FIGS. 22 and 23.

The wireless apparatus 2400 includes a processor 2410, a memory 2420, and an RF unit (radio frequency unit) 2430. The processor 2410 implements the suggested functions, process, and/or method. The processor 2410 may be configured to perform measurement and logging based on a logged measurement configuration. The processor 2410 may be configured to determine the importance of a logged measurement result based on whether a specific condition is satisfied or not. The processor 2410 may be configured to configure an importance tag based on the determined importance, and log the measurement result with the configured importance tag. The processor 2410 may be configured to detect a lack of storage space and determine whether to log a new measurement result. The processor 2410 may be configured to implement an operation of the UE according to the above-described embodiment with reference to FIGS. 22 and 23.

The memory 2420 may provide a storage space storing logged measurement results according to the embodiment of the present invention.

The RF unit 2430 is connected to the processor 2410 to send and receive a radio signal.

The processor 2410 and the RF unit 2430 may be implemented to send and receive a radio signal according to at least one communication protocol. The RF unit 2430 may include at least one transmitter/receiver capable of sending and receiving a radio signal.

The processor may include an application-specific integrated circuit (ASIC), other chipsets, a logic circuit, and/or a data processor. The memory may include a read-only memory (ROM), a random access memory (RAM), a flash memory, a memory card, a storage media, and/or other storage devices. The RF unit may include a baseband circuit for processing the radio signal. When the exemplary embodiment is implemented by software, the above-mentioned method may be implemented by the module (process, function, or the like) that performs the above-mentioned function. The module is stored in the memory and may be performed by the processor. The memory may be in or out of the processor and may be connected to the processor through a variety of well-known means.

Although, in the above illustrative system, the methods have been described on the basis of the flowcharts in the form of a series of the steps or blocks, the present invention is not limited to the sequence of the steps, and some of the steps may be performed at different sequences from the remaining steps or simultaneously with them. Further, those skilled in the art will understand that the steps shown in the flowcharts are not exclusive, the steps may include other steps, or one or more steps of the flowcharts may be deleted without affecting the scope of the present invention.

What is claimed is:

1. A method for logging measurement results in a wireless communication system, the method comprising:
   receiving a logged measurement configuration from a network, the logged measurement configuration comprising information for performing logged Minimization Driving Test (MDT);
   measuring at least one cell based on the logged measurement configuration;
   determining whether the measurement result has importance for logging;
   when a storage space for logging is enough for additional logging, setting an importance tag of the measurement result to a predetermined value in accordance with the determination; and
   logging the measurement result and the importance tag in the storage space.

2. The method of claim 1, wherein the importance tag is set to "1" for indicating that the measurement result has the importance for logging.

3. The method of claim 2, wherein the importance tag is set to "0" for indicating that the measurement result does not have the importance for logging.

4. The method of claim 3, wherein, when the measuring is triggered by a predetermined event, the measurement result has the importance for logging.

5. The method of claim 3, wherein, when the measurement result is measured on a low-interference resource, the measurement result has the importance for logging.

6. The method of claim 3, wherein, when the measurement result is affected by in-device transmission, the measurement result does not have the importance for logging.

7. The method of claim 1, further comprising, when the storage space is not enough for additional logging and the measurement result does not have the importance for logging, discarding the measurement result.

8. The method of claim 7, further comprising:
   when the storage space is not enough for additional logging and the measurement result has the importance for logging:
   setting the importance tag of the measurement result to a value indicating that the measurement result has the importance for logging;
   when at least one logged measurement result not having the importance for logging is stored in the storage space, discarding one of the at least one logged measurement result not having the importance for logging; and
   logging the measurement result and the importance tag in the storage space.

9. The method of claim 8, further comprising, when any logged measurement result not having the importance for logging is not stored in the stored space:
   discarding a firstly logged measurement result having the importance among at least one logged measurement result having the importance included in the storage space; and
   logging the measurement result and the importance tag in the storage space.

10. The method of claim 8, further comprising, when any logged measurement result not having the importance for logging is not included in the storage space, discarding the measurement result.

11. An apparatus operating in a wireless communication system, the apparatus comprising:
    a Radio Frequency (RF) unit configured to transmit and receive radio signals;
    a memory for configured to log at least one measurement result; and
    a processor operably coupled to the RF unit, the processor being configured to:
    receive a logged measurement configuration from a network, the logged measurement configuration comprising information for performing logged Minimization Driving Test (MDT);
    measure at least one cell based on the logged measurement configuration;
    determine whether the measurement result has importance for logging;
    when the memory is enough for additional logging, set an importance tag of the measurement result to a predetermined value in accordance with the determination; and
    log the measurement result and the importance tag in the memory.

12. The apparatus of claim 11, wherein the importance tag is set to "1" for indicating that the measurement result has the importance for logging.

13. The apparatus of claim 12, wherein the importance tag is set to "0" for indicating that the measurement result does not have the importance for logging.

14. The apparatus of claim 13, wherein, when the measuring is triggered by a predetermined event, the measurement result has the importance for logging.

15. The apparatus of claim 13, wherein, when the measurement result is measured on a low-interference resource, the measurement result has the importance for logging.

16. The apparatus of claim 13, wherein, when the measurement result is affected by in-device transmission, the measurement result does not have the importance for logging.

17. The apparatus of claim 11, wherein, when the memory is not enough for additional logging and the measurement result does not have the importance for logging, the processor is further configured to discard the measurement result.

18. The apparatus of claim 17, wherein, when the memory is not enough for additional logging and the measurement result has the importance for logging, the processor is further configured to:
    set the importance tag of the measurement result to a value indicating that the measurement result has the importance for logging;

when at least one logged measurement result not having the importance for logging is stored in the memory, discard one of the at least one logged measurement result not having the importance for logging; and log the measurement result and the importance tag in the memory.

19. The apparatus of claim 18, wherein, when any logged measurement result not having the importance for logging is not stored in the memory, the processor is further configured to:

discard a firstly logged measurement result having the importance among at least one logged measurement result having the importance included in the memory; and log the measurement result and the importance tag in the memory.

20. The apparatus of claim 18, wherein, when any logged measurement result not having the importance for logging is not included in the memory, the processor is further configured to discard the measurement result.

* * * * *